(12) United States Patent
Mickelsen et al.

(10) Patent No.: US 9,909,610 B2
(45) Date of Patent: Mar. 6, 2018

(54) HEAT RESISTANT FASTENING SYSTEMS

(71) Applicant: HONEYWELL INTERNATIONAL INC., Morris Plains, NJ (US)

(72) Inventors: Justin C. Mickelsen, Phoenix, AZ (US); Aaron Duncan, Phoenix, AZ (US); Patrick S. Mulloy, Chandler, AZ (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 335 days.

(21) Appl. No.: 14/973,148

(22) Filed: Dec. 17, 2015

(65) Prior Publication Data
US 2017/0175801 A1   Jun. 22, 2017

(51) Int. Cl.
*F16B 43/00* (2006.01)
*F01D 25/24* (2006.01)
*F02C 7/25* (2006.01)

(52) U.S. Cl.
CPC .......... *F16B 43/001* (2013.01); *F01D 25/243* (2013.01); *F02C 7/25* (2013.01); *F05D 2260/31* (2013.01)

(58) Field of Classification Search
CPC .................................................. F16B 43/001
USPC .......................... 411/531; 169/48; 244/129.2
See application file for complete search history.

(56) References Cited

U.S. PATENT DOCUMENTS

| | | | |
|---|---|---|---|
| 3,391,280 A | 7/1968 | Bonilla et al. | |
| 4,243,835 A * | 1/1981 | Ehrenfels | H02G 3/185 |
| | | | 165/135 |
| 4,646,486 A * | 3/1987 | Hauff | H01B 17/308 |
| | | | 169/54 |
| 5,505,497 A | 4/1996 | Shea et al. | |
| 7,083,372 B2 | 8/2006 | Winker | |
| 8,695,720 B2 * | 4/2014 | Mickelsen | F02C 7/25 |
| | | | 169/11 |
| 8,844,643 B2 * | 9/2014 | Mickelsen | A62C 3/08 |
| | | | 169/11 |
| 2004/0100040 A1 * | 5/2004 | Sakno | F16L 5/04 |
| | | | 277/635 |

(Continued)

FOREIGN PATENT DOCUMENTS

| | | |
|---|---|---|
| EP | 1264996 A1 | 12/2002 |
| EP | 2226518 A2 | 9/2010 |
| WO | 8804385 A1 | 6/1988 |

OTHER PUBLICATIONS

Wald F., et al. "On Bolted Connection With Intumescent Coatings," Czech Technical University in Prague <Retrieved from Internet,> Dec. 17, 2015; vol. 6, No. 2, pp. 159-182, ISSN 1229-9367.

(Continued)

*Primary Examiner* — Gary W Estremsky
(74) *Attorney, Agent, or Firm* — Lorenz & Kopf, LLP

(57) ABSTRACT

A heat resistant washer for a heat resistant fastening system and a heat resistant fastening system is provided. The heat resistant washer includes a fire retardant material, and a housing that includes a base and a flange, with a throughbore defined through the base to receive a fastener. The housing defines a cavity adjacent to the throughbore and at least one guide. The fire retardant material is disposed within the cavity and the at least one guide directs the fire retardant material in an active state out of the cavity.

8 Claims, 15 Drawing Sheets

(56) References Cited

U.S. PATENT DOCUMENTS

2011/0151184 A1* 6/2011 Jundt .................. F16B 43/001
428/138
2013/0322988 A1 12/2013 Handa

OTHER PUBLICATIONS

A.G.S., "Classic Aviation Ads: The Nuts & Bolts of AGS Circa 1960," 1960.
Salter M., "Locking Crown wheel Bolts," Michael's Blog, Nov. 2007.
Extended EP Search Report for Application No. 16199901.6-1760 dated Mar. 5, 2017.

* cited by examiner

HEAT RESISTANT FASTENING SYSTEMS

TECHNICAL FIELD

The present disclosure generally relates to heat resistant fastening systems, and more particularly relates to heat resistant fastening systems including heat resistant washers for protecting associated mechanical fasteners during extreme temperatures.

BACKGROUND

Generally, mechanical fasteners may be used in a variety of assemblies to join adjacent components together to create an assembly. For example, one or more casings, in a vehicle, such as an engine casing for an aircraft, may be fastened together at a joint with the aid of one or more mechanical fasteners. In certain instances, regulatory standards may require that the joint withstand high or extreme temperatures in the case of a thermal event. In order for the joint to withstand high or extreme temperatures, the one or more mechanical fasteners may need to withstand the high or extreme temperatures to maintain the joint between the joined components during the event.

Accordingly, it is desirable to provide heat resistant fastening systems, which include heat resistant washers that shield or protect an associated mechanical fastener during extreme temperatures, such as during a thermal event. Furthermore, other desirable features and characteristics of the present invention will become apparent from the subsequent detailed description and the appended claims, taken in conjunction with the accompanying drawings and the foregoing technical field and background.

SUMMARY

According to various embodiments, provided is a heat resistant washer for a heat resistant fastening system. The heat resistant washer includes a fire retardant material, and a housing that includes a base and a flange, with a throughbore defined through the base to receive a fastener. The housing defines a cavity adjacent to the throughbore and at least one guide. The fire retardant material is disposed within the cavity and the at least one guide directs the fire retardant material in an active state out of the cavity.

Also provided is a heat resistant fastening system. The heat resistant fastening system includes a fastener having a head and a shank, and a heat resistant washer. The heat resistant washer includes a housing having a base and a flange, with a bore defined through the base that receives the shank of the fastener. The housing defines a cavity that surrounds the head of the fastener. The heat resistant fastening system includes a fire retardant material disposed within the cavity so as to be positioned adjacent to the head of the fastener when the fastener is received within the cavity. The housing includes at least one guide to direct the fire retardant material in an active state out of the cavity.

Further provided is a heat resistant fastening system. The heat resistant fastening system includes a fastener having a head and a shank and a heat resistant washer. The heat resistant washer includes a first housing portion and a second housing portion. The first housing portion has a base and a flange, with a bore defined through the base that receives the shank of the fastener and the flange includes at least one guide. The second housing portion is coupled to the first housing portion to define a cavity, and the cavity is in communication with the at least one guide. The heat resistant fastening system includes a fire retardant material disposed within the cavity and the at least one guide directs the fire retardant material in an active state out of the cavity about the head of the fastener.

DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description. In addition, those skilled in the art will appreciate that embodiments of the present disclosure may be practiced in conjunction with any type of fastener that would benefit from heat shielding, such as a rivet, screw, etc., and that the mechanical fastener described herein is merely one exemplary embodiment according to the present disclosure. Moreover, while the heat resistant washer is described herein as being used to shield a mechanical fastener associated with a joint between components onboard a mobile platform, such as a bus, motorcycle, train, motor vehicle, marine vessel, aircraft, rotorcraft and the like, the various teachings of the present disclosure can be used with a joint on a stationary platform, such as a duct associated with a furnace, etc. Further, it should be noted that many alternative or additional functional relationships or physical connections may be present in an embodiment of the present disclosure. In addition, while the figures shown herein depict an example with certain arrangements of elements, additional intervening elements, devices, features, or components may be present in an actual embodiment. It should also be understood that the drawings are merely illustrative and may not be drawn to scale.

Figure 1:
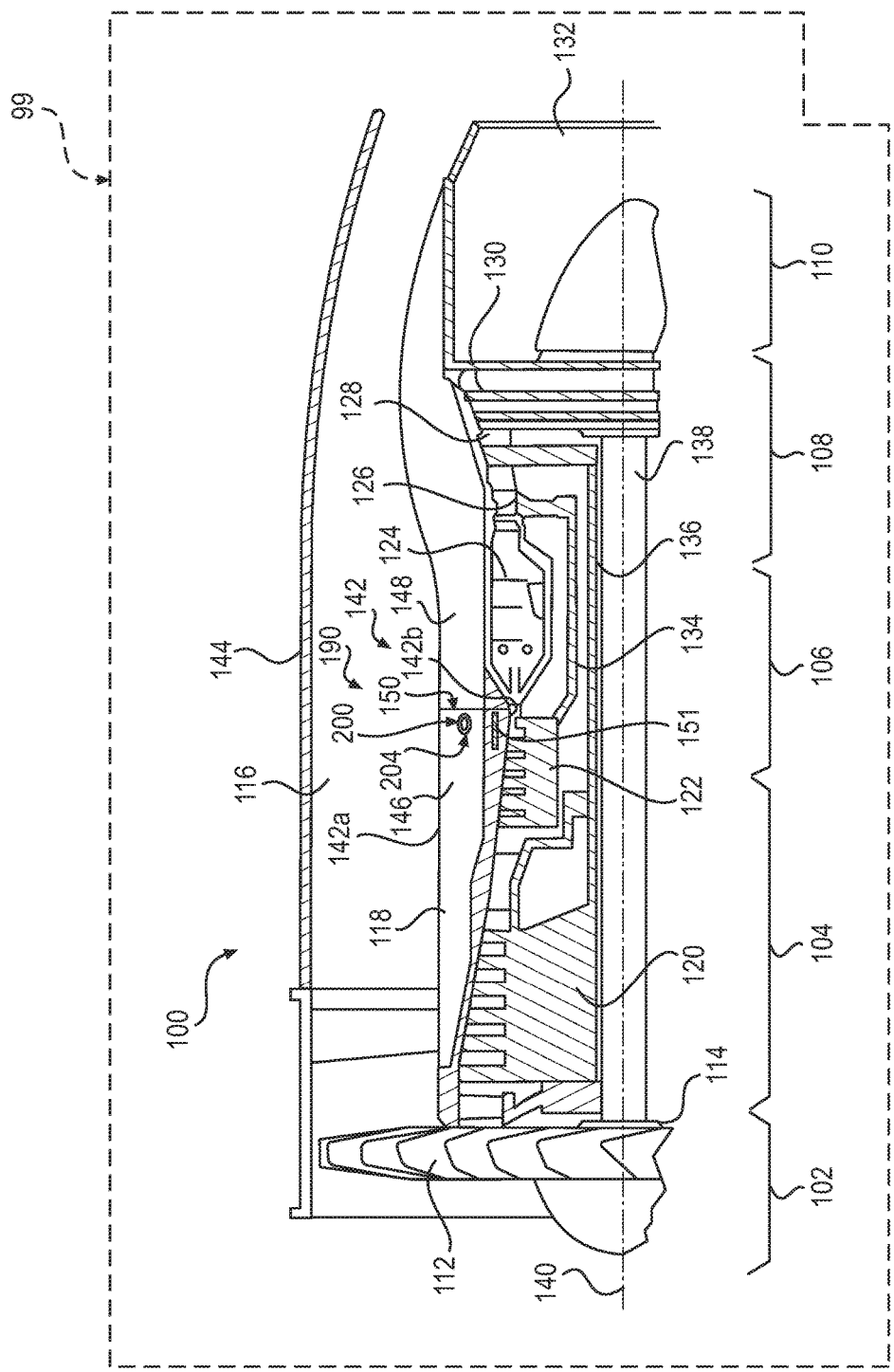
FIG. 1 is a schematic cross-sectional illustration of a gas turbine engine, which includes an exemplary heat resistant fastener system including an exemplary heat resistant washer in accordance with the present disclosure.
Figure 2:
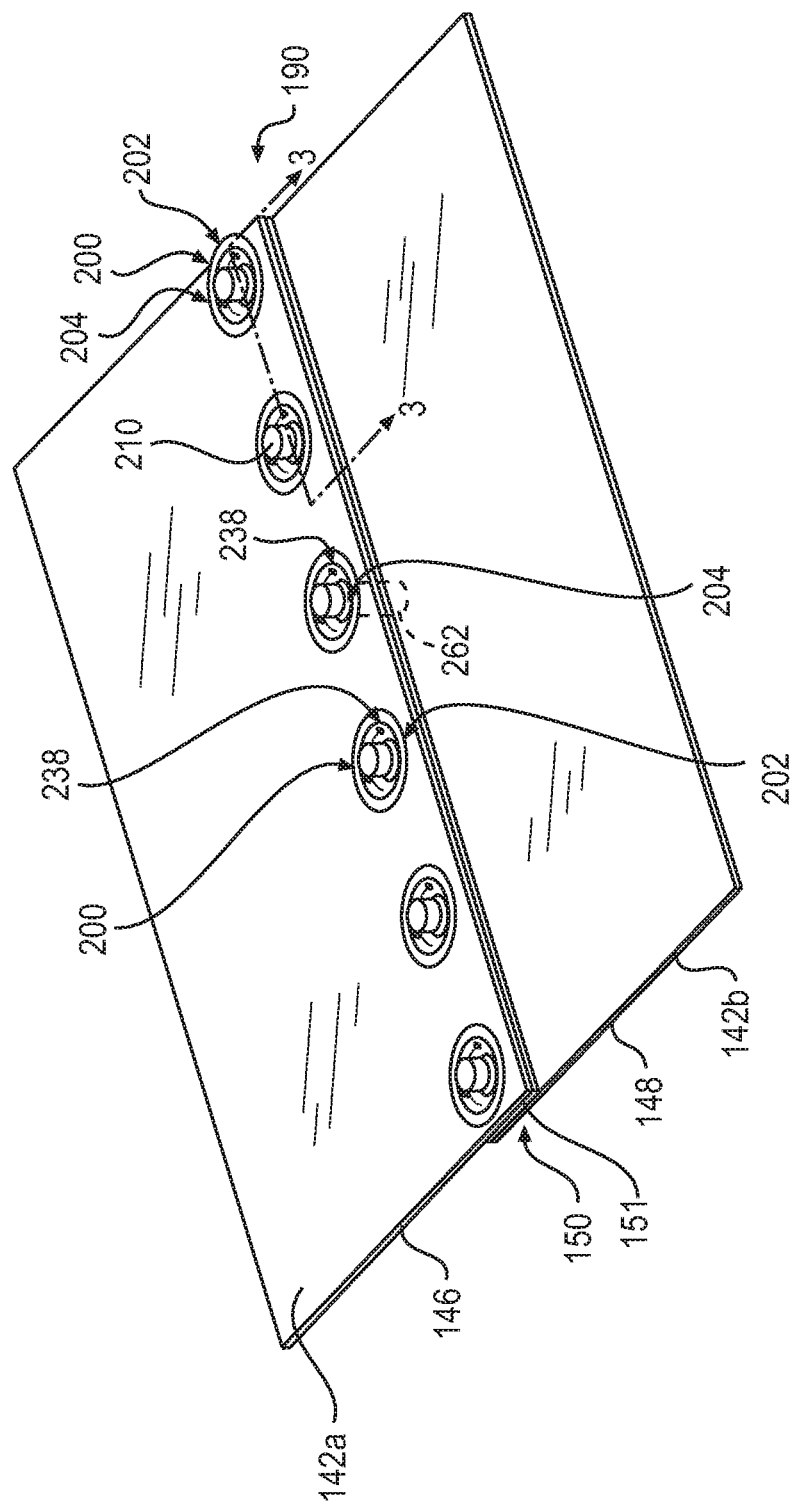
FIG. 2 is a detail view of a joint associated with the gas turbine engine of FIG. 1, which includes the heat resistant fastener system with a fire retardant material in a first, inactive state.

With reference to FIG. 1, a partial, cross-sectional view of an exemplary gas turbine engine 100 is shown with the remaining portion of the gas turbine engine 100 being axi-symmetric about a longitudinal axis 140. In the depicted embodiment, the gas turbine engine 100 is an annular multi-spool turbofan gas turbine jet engine 100 within an aircraft 99, although other arrangements and uses may be provided. The gas turbine engine 100 may be, for example, an auxiliary power unit ("APU"). As will be discussed herein, one or more components of the gas turbine engine 100 may be coupled together with a fireproof system 190, which comprises one or more heat resistant fastening systems 200 that each includes a fireproof or heat resistant washer 202 (FIG. 2). The use of the heat resistant washer 202 protects the joined components during a thermal event by creating a protective shield about each of the respective one or more heat resistant fastening systems 200, as will be discussed in greater detail below.

Figure 3:
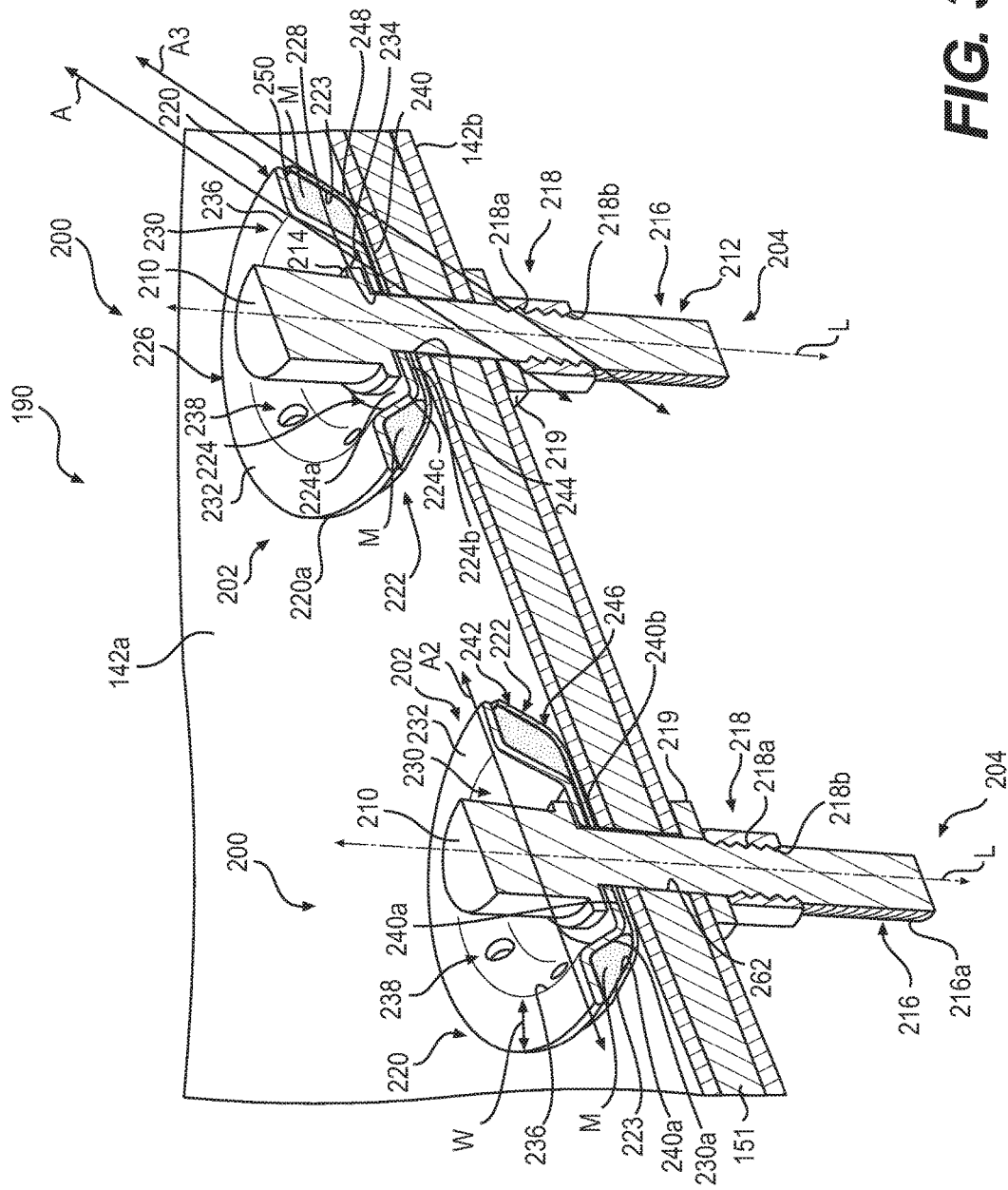
FIG. 3 is a cross-sectional view of the joint of FIG. 2, including the heat resistant fastener system, taken along line 3-3 of FIG. 2.

In this example, the gas turbine engine 100 includes fan section 102, a compressor section 104, a combustor section 106, a turbine section 108, and an exhaust section 110. The fan section 102 includes a fan 112 mounted on a rotor 114 that draws air into the gas turbine engine 100 and accelerates it. A fraction of the accelerated air exhausted from the fan 112 is directed through an outer (or first) bypass duct 116 and the remaining fraction of air exhausted from the fan 112 is directed into the compressor section 104. The outer bypass duct 116 is generally defined by an inner casing 142 and an outer casing 144. In this example, the inner casing 142 includes an outer surface 142a that faces the outer casing 144 to define the outer bypass duct 116 and an inner surface 142b that faces the interior components of the gas turbine engine 100. The inner casing 142 includes a first casing component 146 and a second casing component 148, which are coupled together at a joint 150. With reference to FIG. 3, a seal 151, such as an elastomeric seal, may be positioned between the first casing component 146 and the second casing component 148 at the joint 150 to seal the joint 150, thereby preventing air from entering the outer bypass duct 116 (FIG. 1) from the inner bypass duct 118. The one or more heat resistant fastening systems 200 are positioned along the joint 150 to couple the first casing component 146 to the second casing component 148 while providing thermal resistance or fireproofing along the joint 150.

In the embodiment of FIG. 1, with reference to FIG. 1, the compressor section 104 includes an intermediate pressure compressor 120 and a high pressure compressor 122. However, in other embodiments, the number of compressors in the compressor section 104 may vary. In the depicted embodiment, the intermediate pressure compressor 120 and the high pressure compressor 122 sequentially raise the pressure of the air and direct a majority of the high pressure air into the combustor section 106. A fraction of the compressed air bypasses the combustor section 106 and is used to cool, among other components, turbine blades in the turbine section 108 via an inner (or second) bypass duct 118. The inner bypass duct 118 is generally defined by the inner surface 142b of the inner casing 142 and the interior components of the gas turbine engine 100, such as the compressors 120 and 122.

In the embodiment of FIG. 1, in the combustor section 106, which includes an annular combustor 124, the high pressure air is mixed with fuel and combusted. The high-temperature combusted air is then directed into the turbine section 108. The turbine section 108 includes three turbines disposed in axial flow series, namely, a high pressure turbine 126, an intermediate pressure turbine 128, and a low pressure turbine 130. However, it will be appreciated that the number of turbines, and/or the configurations thereof, may vary. In this embodiment, the high-temperature combusted air from the combustor section 106 expands through and rotates each turbine 126, 128, and 130. The air is then exhausted through a propulsion nozzle 132 disposed in the exhaust section 110. As the turbines 126, 128, and 130 rotate, each drives equipment in the gas turbine engine 100 via concentrically disposed shafts or spools. Specifically, the high pressure turbine 126 drives the high pressure compressor 122 via a high pressure spool 134, the intermediate pressure turbine 128 drives the intermediate pressure compressor 120 via an intermediate pressure spool 136, and the low pressure turbine 130 drives the fan 112 via a low pressure spool 138.

In order to meet certification requirements, portions of aircraft, such as the gas turbine engine 100, are required to be able to function for a specific period of time when exposed to a thermal event, for example during a fire event. As such, aircraft typically include fireproof systems that function to isolate different areas (or zones) of the gas turbine engine 100 such that a thermal event in one area will not spread into another area. As used herein, the term fireproof refers to fire protection or thermal resistance for a subject component or system that satisfies a designated requirement or regulation, such as FAA requirements for aircraft. Such requirements typically require that the fireproof systems are capable of providing protection from a thermal event at a predetermined temperature for a predetermined amount of time. In one exemplary embodiment, a fireproof system 190 may be installed along the joint 150 to prevent or inhibit a fire event from spreading between the outer bypass duct 116 and the inner bypass duct 118 through the inner casing 142, i.e., to render the joint 150 of the gas turbine engine 100 as fireproof according to the applicable standard.

In this example, with reference to FIG. 2, the fireproof system 190 comprises the one or more heat resistant fastening systems 200, which each include the fireproof or heat resistant washer 202. The one or more heat resistant fastening systems 200 are illustrated herein as spanning the joint 150 formed along the inner casing 142. It should be noted, however, that the one or more heat resistant fastening systems 200 may be positioned at or along any desired joint associated with the gas turbine engine 100 (FIG. 1), such that the one or more heat resistant fastening systems 200 may be used to join two adjacent components of the gas turbine engine 100 (FIG. 1) while providing fireproofing via the heat resistant washers 202. Thus, the location of the one or more heat resistant fastening systems 200 and the heat resistant washers 202 along the joint 150 of the inner casing 142 is merely an example. As a further example, with reference to FIG. 1, the one or more heat resistant fastening systems 200 may be located along the outer bypass duct 116. In the example of the outer bypass duct 116, the heat resistant washer 202 of the one or more heat resistant fastening systems 200 would be located on the exterior or outside of the outer bypass duct 116.

With reference to FIG. 2, a portion of the joint 150 is shown in more detail. As discussed, in this example, the joint 150 is formed between the first casing component 146 and the second casing component 148 of the inner casing 142. The joint 150 is illustrated herein as a lap joint, however, the joint 150 may comprise any suitable joint for coupling adjacent components together via the one or more heat resistant fastening systems 200. Moreover, while the one or more heat resistant fastening systems 200 are illustrated herein as coupling together the first casing component 146 and the second casing component 148, the one or more heat resistant fastening systems 200 may be used to couple together various components associated with the gas turbine engine 100 (FIG. 1), such as an access panel in a casing of the gas turbine engine 100, a bypass duct, etc. In this example, the one or more heat resistant fastening systems 200 comprise a plurality of heat resistant fastening systems 200, with each of the heat resistant fastening systems 200 including a mechanical fastener 204 and the heat resistant washer 202.

With reference to FIGS. 2 and 3, the mechanical fastener 204 comprises a suitable mechanical fastener for coupling the first casing component 146 to the second casing component 148. In this example, with reference to FIG. 3, the mechanical fastener 204 comprises a bolt, having a head 210 and a shank 212. While the mechanical fastener 204 is described and illustrated herein as comprising the bolt, it will be understood that any suitable mechanical fastener 204 may be employed with the heat resistant washer 202, such as a rivet, screw, etc. Thus, the bolt is merely an example.

The mechanical fastener 204 is generally composed of a metal or metal alloy, such as steel, and may be cast, machined or formed through any suitable forming technique. The head 210 of the mechanical fastener 204 may include a flange 214, which may cooperate with or bear against a portion of the heat resistant washer 202. The flange 214 generally extends about a circumference of the head 210, but the flange 214 may only extend about a portion of the head 210. Moreover, the head 210 need not include the flange 214 such that a portion of the head 210 bears directly against the heat resistant washer 202. The head 210 may also include one or more coupling features, such as a recessed socket, etc. to facilitate the coupling of the head 210 to a suitable fastener driving device, such as a socket wrench, etc. The head 210 may also comprise a hex-head, such that the coupling features are disposed about an exterior of the head 210 itself.

The shank 212 extends from the head 210. In this example, a portion 216 of the shank 212 includes a plurality of threads 216a. It should be noted, however, that an entirety of the shank 212 may include the plurality of threads 216a, if desired. A nut 218, having a corresponding plurality of threads 218a defined about a throughbore 218b, is received on the shank 212 to couple the mechanical fastener 204 at the joint 150. In one example, a washer 219 is coupled between the nut 218 and the inner surface 142b of the inner casing 142. The washer 219 may comprise any suitable washer, such as a flat washer composed of a metal or metal alloy. The nut 218 may also include a flange to cooperate with or bear against the washer 219, or alternatively, the inner surface 142b of the inner casing 142 if the washer 219 is not employed.

As shown in FIG. 2, the heat resistant washer 202 is substantially annular and is coupled about the shank 212 of the mechanical fastener 204 so as to be disposed between the flange 214 of the head 210 and, in this example, the outer surface 142a of the inner casing 142. With reference to FIG. 3, the heat resistant washer 202 includes a housing. In this example, the housing includes a first housing portion 220 and a second housing portion 222 that are coupled together to define a cavity 223. The first housing portion 220 is composed of any suitable material, such as a metal or metal alloy, and is machined, cast or stamped. Alternatively, the first housing portion 220 may be formed through selective laser sintering, for example. The second housing portion 222 is composed of any suitable material, such as a polymer. Generally, the second housing portion 222 is composed of a material that enables the second housing portion 222 to be substantially instantaneously consumed during a thermal event, such as a fire, and in one example, the second housing portion is composed of polyurethane, polypropylene, or polyethylene. The second housing portion 222 is coupled to the first housing portion through any suitable technique, and in one example, the second housing portion 222 may be sprayed, dipped, shrink wrapped, adhesively coupled, etc. to the first housing portion 220. The second housing portion 222 is generally configured with a sufficient thickness to protect a fire retardant material M coupled about a portion of the first housing portion 220. Generally, the heat resistant washer 202 is symmetrical about a longitudinal axis L of the heat resistant washer 202. It should be noted, however, that the heat resistant washer 202 may be asymmetrical about the longitudinal axis L, if desired.

Figure 4:
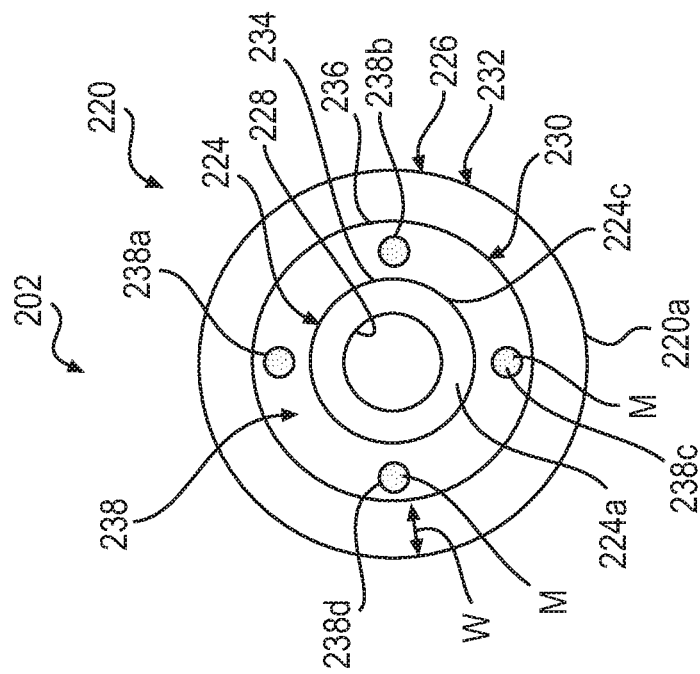
FIG. 4 is a top view of a heat resistant washer according to the present disclosure.

With reference to FIGS. 3 and 4, in this example, the first housing portion 220 includes a base 224 and a flange 226, which extends outwardly from the base 224. The base 224 is substantially circular, and defines a bore 228 that receives a portion of the shank 212 of the mechanical fastener 204. The bore 228 is generally defined through the base 224 such that a central axis of the bore 228 extends along the longitudinal axis L of the heat resistant washer 202. The base 224 further defines a first surface 224a, a second surface 224b and a perimeter 224c. The first surface 224a is adjacent to the flange 214 of the head 210 when the mechanical fastener 204 is coupled to the heat resistant washer 202. The second surface 224b is coupled to the second housing portion 222. The flange 226 is coupled to the perimeter 224c, and extends outwardly from the perimeter 224c of the base 224.

In one example, the flange 226 includes a wall 230 and a lip 232. The wall 230 has a first end 234 and a second end 236. The first end 234 is coupled to the perimeter 224c of the base 224, and the second end 236 is coupled to the lip 232. With reference to FIG. 3, the wall 230 extends along an axis A from the first end 234 to the second end 236, which is transverse to the longitudinal axis L. In one example, the wall 230 has a positive slope between the first end 234 and the second end 236 such that the second end 236 of the wall 230 is not coplanar with the first end 234. The wall 230 forms or defines one or more guides or directing features, such as directing bores 238 (FIG. 3).

With reference to FIG. 4, the one or more directing bores 238 are spaced apart about a circumference of the wall 230, with the circumference of the wall 230 being defined between the first end 234 and the second end 236 of the wall 230. Generally, the one or more directing bores 238 are spaced apart on the wall 230 such that the first housing portion 220 is symmetric with respect to the longitudinal axis L. It should be understood, however, that the directing bores 238 may be defined about the wall 230 such that the first housing portion 220 is asymmetric with respect to the longitudinal axis L. With additional reference to FIG. 3, the one or more directing bores 238 are defined through the wall 230 such that each of the one or more directing bores 238 is in communication with the cavity 223. In this example, as best shown in FIG. 4, the one or more directing bores 238 comprise four directing bores 238a-238d. Given the positive slope of the wall 230, each of the directing bores 238a-238d are defined to direct the fire retardant material M within the cavity 223 (FIG. 3) towards the head 210 of the mechanical fastener 204 (FIG. 3), thereby fireproofing or shielding the head 210 of the mechanical fastener 204 (FIG. 3) during a thermal event as will be discussed further herein.

The lip 232 is coupled about the second end 236 and defines a perimeter 220a of the first housing portion 220. With reference to FIG. 3, the lip 232 generally extends outwardly from the second end 236 of the wall 230 along an axis A2, which is transverse to, and in one example, substantially perpendicular to, the longitudinal axis L. With reference to FIGS. 3 and 4, the lip 232 has a width W, which cooperates with the second housing portion 222 to define the cavity 223. The first housing portion 220 is coupled to the second housing portion 222 about the perimeter defined by the lip 232 of the first housing portion 220 to define the cavity 223.

Figure 5:
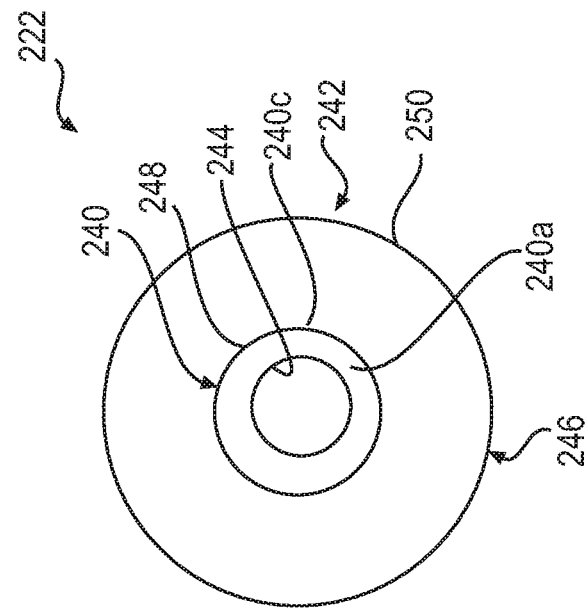
FIG. 5 is a top view of a second housing portion of the heat resistant washer of FIG. 4.

With reference to FIGS. 3 and 5, the second housing portion 222 is coupled to the base 224 and the lip 232 of the first housing portion 220. In this example, the second housing portion 222 is substantially cup or U-shaped, and defines a second base 240 and a second flange 242. It should be noted that the shape of the second housing portion 222 is merely exemplary, as the second housing portion 222 may have a shape that conforms to the fire retardant material M disposed about the first housing portion 220. With particular reference to FIG. 5, in this example, the second base 240 is substantially circular, and defines a second bore 244 that receives a portion of the shank 212 of the mechanical fastener 204. The second bore 244 is generally defined through the second base 240 such that the second bore 244 is coaxial with the bore 228 and such that a central axis of the second bore 244 extends along the longitudinal axis L of the heat resistant washer 202 (FIG. 3). The second base 240 further defines a first surface 240a, a second surface 240b (FIG. 3) and a perimeter 240c. The first surface 240a is coupled to the first housing portion 220. The second surface 240b is adjacent to the inner surface 142b of the inner casing 142 when the heat resistant washer 202 is coupled to the mechanical fastener 204. The second flange 242 is coupled to the perimeter 240c, and extends outwardly from the perimeter 240c of the second base 240. Thus, the second housing portion 222 is coupled to the perimeter defined by the lip 232 of the flange 226 and extends about the first housing portion 220 between the flange 226 and the base 224 to define the cavity 223 (FIG. 3).

In one example, the second flange 242 includes a second wall 246. The second wall 246 has a third end 248 and a fourth end 250. The third end 248 is coupled to the perimeter 240c of the second base 240, and the fourth end 250 is coupled to the lip 232 of the first housing portion 220. With reference to FIG. 3, in this example, the second wall 246 extends along an axis A3 from the third end 248 to the fourth end 250, which is transverse to the longitudinal axis L. In one example, the second wall 246 has a positive slope between the third end 248 and the fourth end 250 such that the fourth end 250 of the second wall 246 is not coplanar with the third end 248. The second wall 246 may have the same slope or a different slope than the wall 230.

Figure 6:
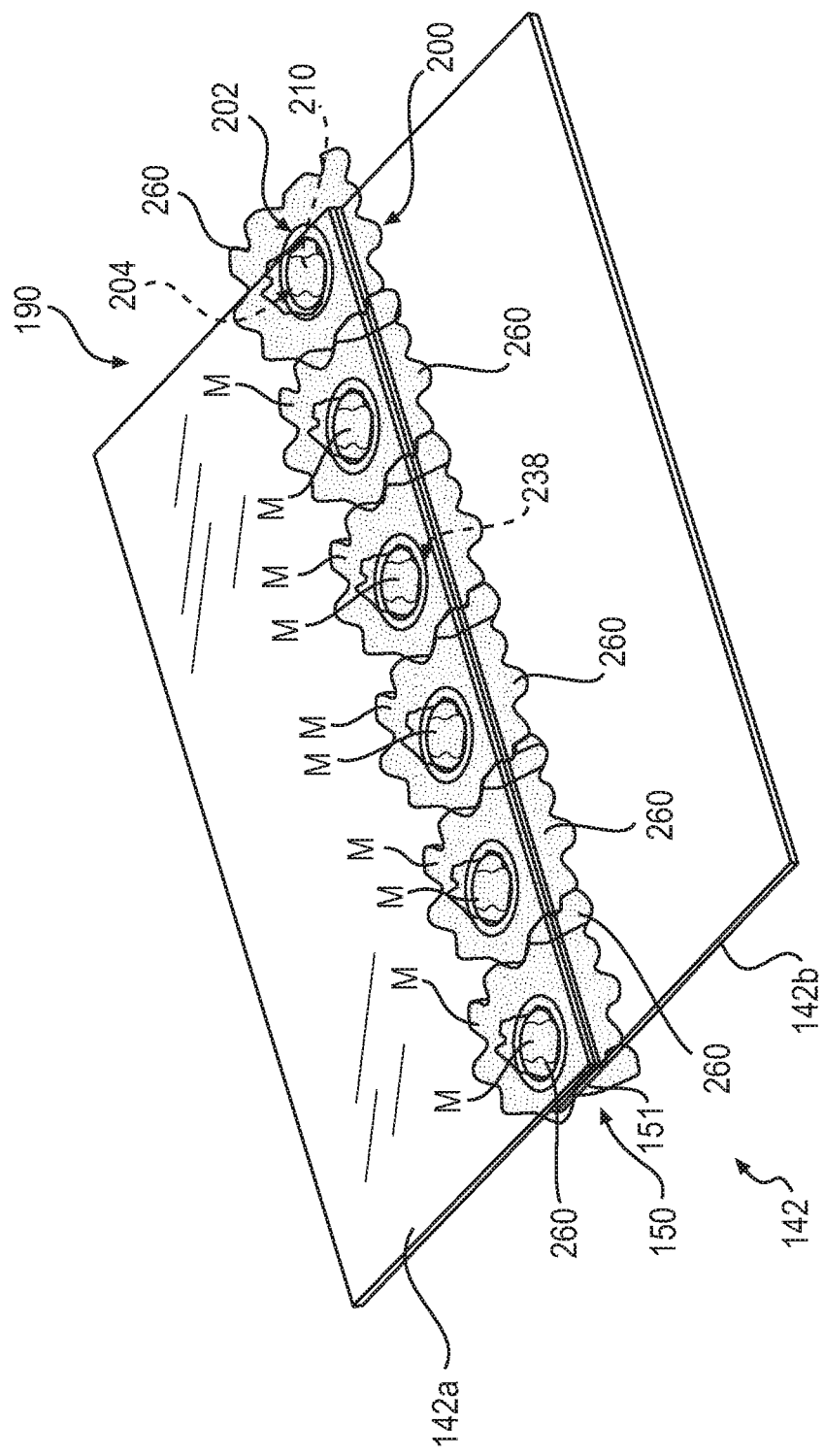
FIG. 6 is a detail view of the joint associated with the gas turbine engine of FIG. 1, which includes the heat resistant fastener system with the fire retardant material in a second, active state.

With reference to FIGS. 3 and 5, the cavity 223 is defined as a volume between a surface 230a of the wall 230 from the perimeter 224c of the base 224 to the coupled portion of the lip 232 that receives the fire retardant material M, which is bounded by a second surface 246a of the second wall 246 defined between the second base 240 and the fourth end 250. Generally, with reference to FIG. 3, the surface 230a of the wall 230 and the width W of the lip 232 cooperates to define the volume of the cavity 223 formed by coupling the second housing portion 222 to the first housing portion 220. Thus, by varying the slope of the wall 230 and the width W of the lip 232, the volume of the cavity 223 defined by coupling the second housing portion 222 to the first housing portion 220 may be adjusted to correspond with different fireproofing requirements. In one example, substantially an entirety of the volume between the surface 230a and the lip 232 is filled with the fire retardant material M. It will be understood, however, that only a portion of the volume between the surface 230a and the lip 232 may be filled with the fire retardant material M depending upon the fireproofing or thermal resistance requirements, if desired. The fire retardant material M may comprise any suitable intumescent material that is responsive to extreme high temperatures, such as during a fire event, to change from a first, inactive state (FIGS. 2 and 3), to a second, active state (FIG. 6). The volume defined between the surface 230a and the lip 232 may be filled with the fire retardant material M through any suitable technique, such as the use of an injection device, like an injection nozzle, spray coating, painting, etc. or may be filled within the second housing portion 222 prior to the second housing portion 222 being coupled to the first housing portion 220. Moreover, the fire retardant material M may be coupled to the surface 230a of the wall 230 prior to coupling the second housing portion 222 to the first housing portion 220, via spraying, painting, etc.

With reference to FIG. 6, the fire retardant material M, in the active condition, expands in the direction indicated by shaded regions 260 and functions to fireproof the area around the respective mechanical fastener 204, and thus, the joint 150. As illustrated in FIG. 3, the directing bores 238 direct the fire retardant material M such that the head 210 of the mechanical fastener 204 is protected by the fire retardant material M, and moreover, the seal 151 and the joint 150 adjacent to the one or more heat resistant fastening systems 200 is further protected by the fire retardant material M. Generally, the directing bores 238 serve to guide the fire retardant material M as it expands out of the cavity 223 such that the head 210 of the mechanical fastener 204 is covered by the fire retardant material M in the active state, and a portion surrounding the heat resistant fastening system 200, such as the seal 151 and the joint 150 itself, is also covered by the fire retardant material M in the active state.

In one exemplary embodiment, the fire retardant material M in made up of a single component that expands as shown in FIG. 6 and that functions to suppress the fire. However, in another exemplary embodiment, the fire retardant material M may include a first component that expands as shown in FIG. 6 and that functions as a carrier for a second component that suppresses the fire. In the active condition, the fire retardant material M may function as a low oxygen content gas barrier (i.e., as a gas) or a direct thermal barrier (i.e., as a foam) between the fire and the area to be protected, such as the mechanical fasteners 204, the seal 151 and the joint 150 (FIG. 3). As such, the fire retardant material M may be "self-foaming" or "self-sublimating" (or "self-ablative") based on the predetermined temperature. In one exemplary embodiment, the predetermined temperature is about 800-1200° F. In other exemplary embodiments, the predetermine temperature may be, for example, about 350° F. 400° F., and 900° F., although the fire retardant material M may be designed for any temperature.

Examples of suitable materials that compose the fire retardant material M include intumescents that expand upon application of heat to insulate an underlying substrate of an area to be protected, such as the mechanical fastener 204, the seal 151 and/or the joint 150. In addition to the insulating properties, materials such as intumescents may also form a protective char layer that when combined with the insulating barrier provides a higher degree of protection. In some exemplary embodiments, intumescent materials function by either chemical or physical action. Example of chemical action include the use of a carbon-rich char forming source such as glucose or a phosphoric acid source such as ammonium phosphate to promote char formation and a gas releasing intumescent source such as urea or chlorinated paraffin. Physical intumescents include expandable graphite coatings. Expandable graphite flakes are formed by the introduction of intercalants such as sulfuric or nitric acid that expand the graphite layers upon exposure to heat. The resulting expansion may be on the order of up to 300 times the original volume, providing a high degree of protection to the substrate. Solid-phase retardants may form a carbonaceous char layer on the surface of the substrate that inhibits further burning. High char formation resin systems such as some epoxy and BMI formulations provide this intrinsic benefit. Other examples of suitable material that compose the fire retardant material M include ablatives, perfluorocarbons (PFCs), hydrofluorocarbons (HFCs), water, $NaHCO_3$, potassium acetate, labile bromine suppressants, or inert gases such as $N_2$, $CO_2$, or Ar. A further example is Halon 1211 ($CF_2BrCl$) that in the active condition displaces the oxygen feeding the fire and additionally generates Br and Cl atoms that interfere with flame chemistry. Generally, no propellant is necessary, but such distribution aids may be provided. Additionally, one or more intumescents or other materials may be combined to select desirable combinations of expansion characteristics and fire retardant characteristics. The base components of the fire retardant material M may be selected from commercially available sources. In this example, the fire retardant material M comprises CEASE-FIRE™ intumescent epoxy coating, which is commercially available from Cote-L Industries, Inc. of Teaneck, N.J. However, it will be understood that any suitable intumescent material may comprise the fire retardant material M.

With reference to FIG. 3, in order to assemble the heat resistant washer 202, in one example, with the first housing portion 220 formed, the fire retardant material M is coupled to the volume defined between the surface 230*a* and the lip 232. With the fire retardant material M disposed about the first housing portion 220, the second housing portion 222 is coupled to the first housing portion 220 to enclose the cavity 223. In the example of the fire retardant material M comprising an intumescent epoxy coating, the fire retardant material M may be painted or sprayed onto the first housing portion 220 in the volume defined between the surface 230*a* of the wall 230 and the lip 232.

With the heat resistant washer 202 assembled, the heat resistant washer 202 may be coupled to the mechanical fastener 204. In this example, with reference to FIG. 2, a respective heat resistant washer 202 may be positioned about a respective bore 262 defined through the first casing component 146, the seal 151 and the second casing component 148 at the joint 150, and a respective mechanical fastener 204 is inserted through the bore 228 and the second bore 244 of the heat resistant washer 202. A respective nut 218 (FIG. 3) may be coupled to the shank 212 of the mechanical fastener 204 to couple or secure the mechanical fastener 204 to the heat resistant washer 202 at the joint 150, thereby forming a respective heat resistant fastening system 200. This process may be repeated for each of the heat resistant fastening system 200 associated with the joint 150.

With the one or more heat resistant fastening systems 200 coupled at the joint 150, during an event, such as a thermal or fire event, the fire retardant material M disposed in the cavity 223 (FIG. 3) is heated. The heating of the fire retardant material M causes the fire retardant material M to change from the first, inactive state (FIGS. 2 and 3) to the second, active state (FIG. 6). In the second, active state as illustrated in FIG. 6, the fire retardant material M expands through the one or more directing bores 238 over the head 210 of the mechanical fastener 204 and expands beyond the head 210 of the mechanical fastener 204 such that the fire retardant material M covers the joint 150, including the seal 151.

By directing the fire retardant material M through the one or more directing bores 238, the fire retardant material M may be directed to the area of the joint 150 that requires the fireproofing without requiring additional measures, such as fireproof paneling. Further, the use of the heat resistant washer 202 provides weight savings as the heat resistant washer 202 may weigh less than conventional fireproofing systems, such as fireproof panels. Moreover, the use of the heat resistant washer 202 enables the mechanical fastener 204 to be easily removed and replaced, during a repair, for example. Also, in the instance of a fire event, the used fire retardant material M from the associated heat resistant washer 202 may be easily removed and replaced with a new heat resistant washer 202, if desired. Thus, the heat resistant washer 202 enables for fireproofing portions of the gas turbine engine 100 in a standardized way, in that the same heat resistant washer 202 may be used with any fastener having a bolt shank that is substantially the same size as the shank 212, the bore 228 and the second bore 244 of the heat resistant washer 202, such as the mechanical fastener 204, associated with the gas turbine engine 100. In addition, for each class or size of mechanical fastener, a corresponding heat resistant washer 202 may be provided with an appropriately sized bore 228 and second bore 244 to enable the heat resistant washer 202 to adapt to various sizes and classes of fasteners. This reduces complexity of the fireproofing for the gas turbine engine 100, and moreover, provides weight savings for the gas turbine engine 100.

Figure 7:
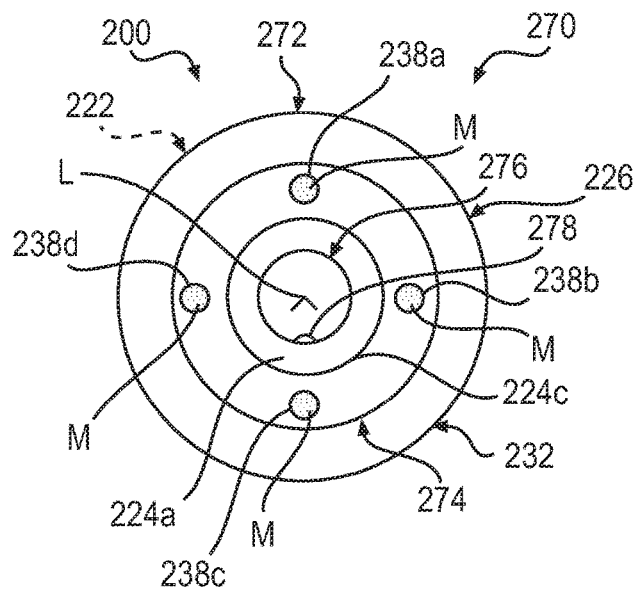
FIG. 7 is a top view of the heat resistant washer according to the present disclosure, which includes an anti-rotation feature.
Figure 7B:
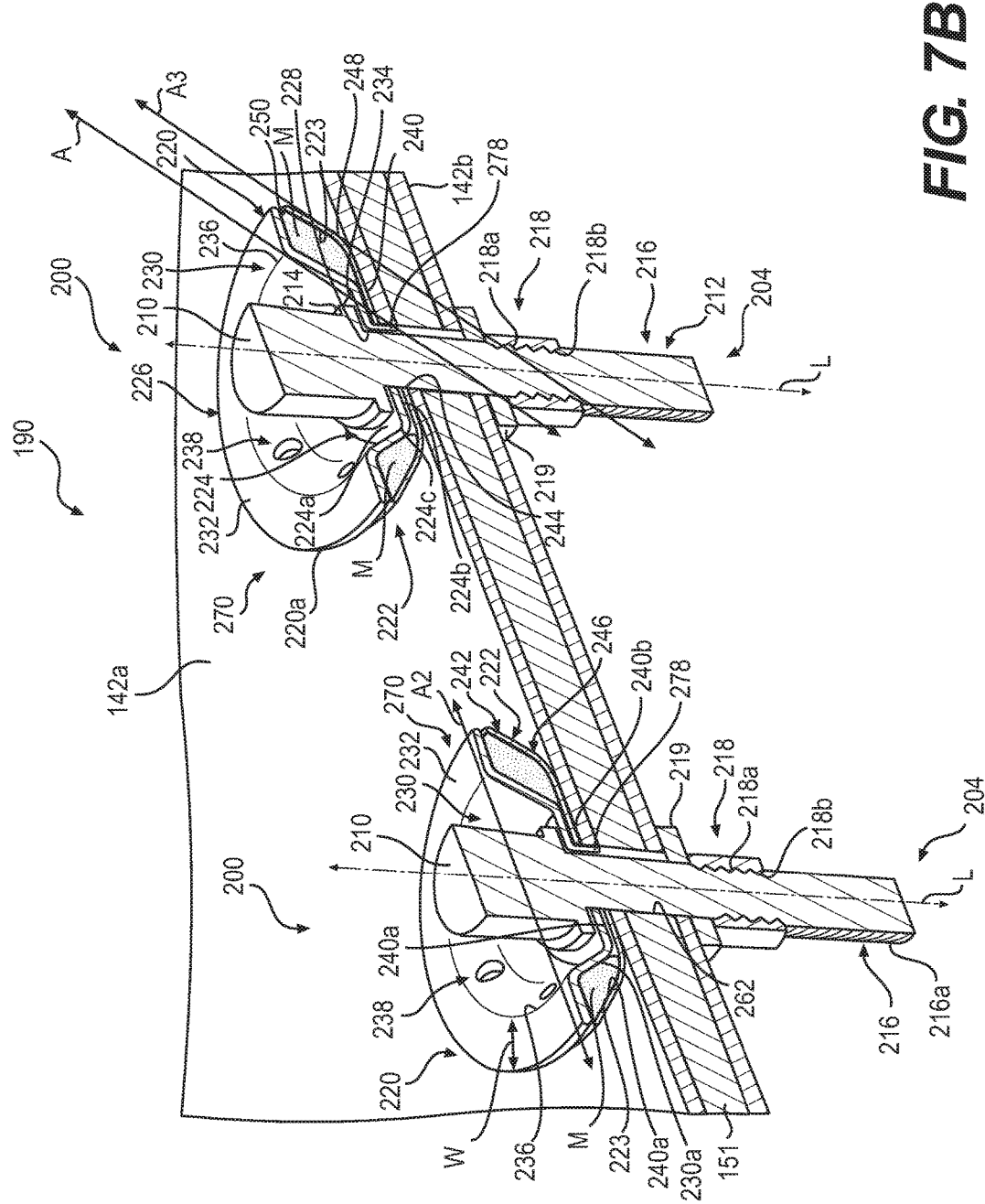
FIG. 7B is a schematic cross-sectional view of the joint of FIG. 2, which includes the heat resistant washer of FIG. 7, taken along line 3-3 of FIG. 2.

It should be appreciated that the heat resistant washer 202 may be constructed somewhat differently. With reference to FIGS. 7 and 7B, a heat resistant washer 270 is shown. As this heat resistant washer 270 is substantially similar to the heat resistant washer 202 discussed with regard to FIGS. 1-6, the same reference numerals will be used to denote the same or similar components. In the example of FIGS. 7 and 7B, the heat resistant washer 270 is substantially annular and may be coupled about the shank 212 of the mechanical fastener 204 so as to be disposed between the flange 214 of the head 210 and, in this example, the outer surface 142a of the inner casing 142 (FIG. 7B). The heat resistant washer 270 includes a housing, and in this example, the housing includes a first housing portion 272 and the second housing portion 222 that are coupled together to define the cavity 223 (FIG. 7B). The first housing portion 272 is composed of any suitable material, such as a metal or metal alloy, and is machined, cast or stamped. Alternatively, the first housing portion 272 may be formed through selective laser sintering, for example. The second housing portion 222 is coupled to the first housing portion 272 through any suitable technique, and in one example, the second housing portion 222 may be sprayed, dipped, shrink wrapped, adhesively coupled, etc. to the first housing portion 220.

In this example, the first housing portion 272 includes a base 274 and the flange 226, which extends outwardly from the base 274. The base 274 is substantially circular, and defines a bore 276 that receives a portion of the shank 212 of the mechanical fastener 204. The bore 276 is generally defined through the base 274 such that a central axis of the bore 276 extends along the longitudinal axis L of the heat resistant washer 270. In one example, the bore 276 includes an anti-rotation projection 278. The anti-rotation projection 278 projects inwardly from a circumference of the bore 276 to lock a position of the heat resistant washer 270 relative to the respective portion of the inner casing 142, such as the first casing component 146 or the second casing component 148. In this example, with reference to FIG. 7B, the anti-rotation projection 278 is movable by the mechanical fastener 204 received in the bore 276 to drive the anti-rotation projection 278 into the respective one of the first casing component 146 and the second casing component 148 to inhibit or prevent the movement of the heat resistant washer 270 relative to the respective one of the first casing component 146 and the second casing component 148. Thus, the advancement of the mechanical fastener 204 through the bore 276 moves or drives the anti-rotation projection 278 into the respective one of the first casing component 146 and the second casing component 148 to lock the position of the heat resistant washer 270, while still enabling the movement of the mechanical fastener 204. In certain instances, it is desirable to prevent the rotation of the heat resistant washer 270 relative to the respective one of the first casing component 146 and the second casing component 148 to maintain the directing bores 238a-238d in a desired alignment relative to a joint or joined components, such as the joint 150. The base 274 further defines the first surface 224a, the second surface 224b and the perimeter 224c. The flange 226 is coupled to the perimeter 224c, and extends outwardly from the perimeter 224c of the base 274.

As the heat resistant washer 270 is substantially similar to the heat resistant washer 202 discussed with regard to FIGS. 1-6, the assembly and use of the heat resistant washer 270 will not be discussed in great detail herein as one of skill in the art understands how to assemble and use the heat resistant washer 270 based on the description of the heat resistant washer 202. Briefly, however, with the heat resistant washer 270 assembled, the heat resistant washer 270 may be coupled to the joint 150 as shown in FIG. 7B. With the mechanical fastener 204 inserted through the bore 276, the anti-rotation projection 278 may be driven into the respective one of the first casing component 146 and the second casing component 148 by the advancement of the mechanical fastener 204 into the bore 276, as shown in FIG. 7B. With the anti-rotation projection 278 extending into the bore 276, the movement of the heat resistant washer 270 relative to the respective one of the first casing component 146 and the second casing component 148 is fixed, such that the orientation of the directing bores 238a-238d is substantially fixed throughout the use of the heat resistant washer 270.

Figure 8:
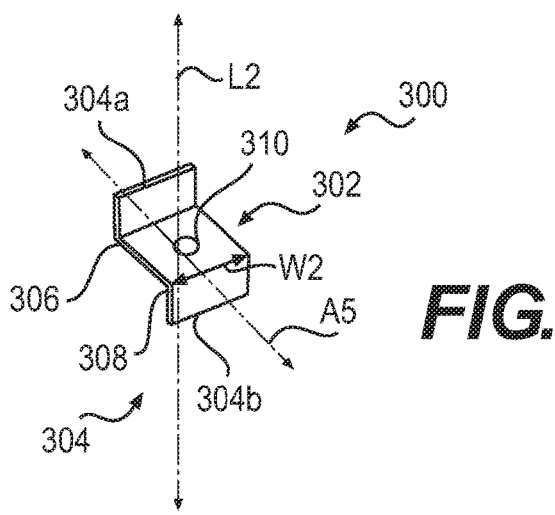
FIG. 8 is a perspective view of an alignment shield for use with one or more of the heat resistant fastener systems according to the present disclosure.

With reference now to FIG. 8, an exploded view of an alignment shield 300 for use with the fireproof system 190 of FIGS. 1-6 is shown. With reference to FIGS. 1-6 and 8, the alignment shield 300 cooperates with the directing bores 238 to provide an additional directional guide for the expansion of the fire retardant material M. In this example, the alignment shield 300 may be coupled about the heat resistant washer 202 discussed with regard to FIGS. 1-6. In the example of FIG. 8, the alignment shield 300 comprises a substantially monolithic or one piece component. In this example, the alignment shield 300 is formed out of a metal or metal alloy, which may be stamped, machined, etc. to form the alignment shield 300. The alignment shield 300 includes a platform 302 and one or more guides or directing features, such as directing arms 304. As will be discussed, the one or more directing arms 304 cooperate with the directing bores 238 of the heat resistant washer 202 of FIGS. 1-6 to direct the fire retardant material M when the fire retardant material M is in the second, active state.

With continued reference to FIG. 8, the platform 302 extends along an axis A5, which is transverse to a longitudinal axis L2 of the alignment shield 300. In one example, the axis A5 is substantially perpendicular to the longitudinal axis L2. The platform 302 generally has a width W2, which is sized to cooperate with the heat resistant washer 202. The platform 302 includes a first platform end 306, a second platform end 308 and defines a bore 310 between the first platform end 306 and the second platform end 308. The first platform end 306 is coupled to one of the one or more directing arms 304, and the second platform end 308 is coupled to another of the one or more directing arms 304. The bore 310 is defined through the platform 302 to enable a portion of the mechanical fastener 204 (FIG. 9) to pass through the bore 310.

Figure 9:
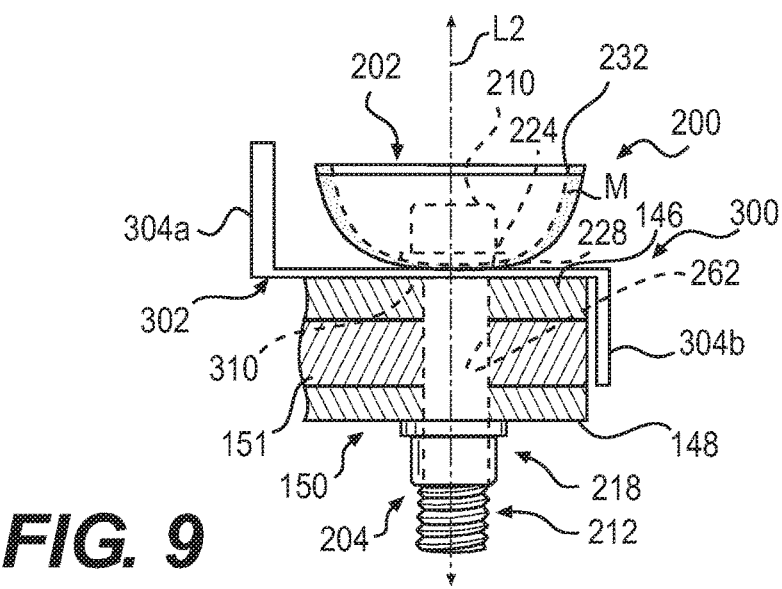
FIG. 9 is a side view of the alignment shield of FIG. 8 coupled to a heat resistant fastener system of FIG. 3.

The one or more directing arms 304 are coupled to the platform 302. In this example, the alignment shield 300 includes two directing arms 304a, 304b, however, it will be understood that the alignment shield 300 may include any number of directing arms 304, such as one, three, four, etc. The directing arm 304a is coupled to the first platform end 306, and the directing arm 304b is coupled to the second platform end 308. Generally, the directing arm 304a extends upwardly from the platform 302 along the longitudinal axis L2 to direct the fire retardant material M (FIG. 9) in the second, active state over the head 210 of the mechanical fastener 204. The directing arm 304b extends downwardly from the platform 302 along the longitudinal axis L2 or extends in a substantially opposite direction than the directing arm 304a to enable the fire retardant material M in the second, active state to expand over the joint 150. Moreover, the directing arm 304b also acts as a shield over the joint 150, as shown in FIG. 9. With continued reference to FIG. 9, the directing arm 304a has a length along the longitudinal axis L2 that enables the directing arm 304a to extend beyond or above a surface of the lip 232 of the heat resistant washer 202, and the directing arm 304b has a length along the longitudinal axis L2 that enables the directing arm 304b to cover the joint 150.

With continued reference to FIG. 9, in order to employ the alignment shield 300 with one or more of the heat resistant fastening systems 200, with the alignment shield 300 formed, the alignment shield 300 may be positioned over the bore 262 defined through the first casing component 146, the seal 151 and the second casing component 148 at the joint 150. The heat resistant washer 202 may be positioned such that the bore 228 and the second bore 244 of the heat resistant washer 202 are coaxially aligned with the bore 310 of the alignment shield 300. The mechanical fastener 204 is inserted into through the bore 228 and the second bore 244 of the heat resistant washer 202, and the bore 310 of the platform 302. The nut 218 may be coupled to the shank 212 of the mechanical fastener 204, thereby securing the heat resistant fastening system 200 and the alignment shield 300 at the joint 150. With the alignment shield 300 coupled at the joint 150, the directing arm 304a may assist the directing bores 238 (FIG. 4) in directing or guiding the fire retardant material M in the second, active state over the mechanical fastener 204 and the joint 150. The directing arm 304b also protects the seal 151 at the joint 150, by providing a protective cover over the seal 151. Thus, the alignment shield 300 may further assist in fireproofing the joint 150. It should be noted that while the alignment shield 300 is illustrated as being applied to a single heat resistant fastening system 200 in FIG. 9, the alignment shield 300 may be applied to a plurality of heat resistant fastening systems 200, such as the plurality of heat resistant fastening systems 200 illustrated in FIG. 2. Moreover, the alignment shield 300 may be applied to a selected number of the plurality of heat resistant fastening systems 200 illustrated in FIG. 2 depending upon the desired amount of fireproofing at the joint 150.

Figure 10:
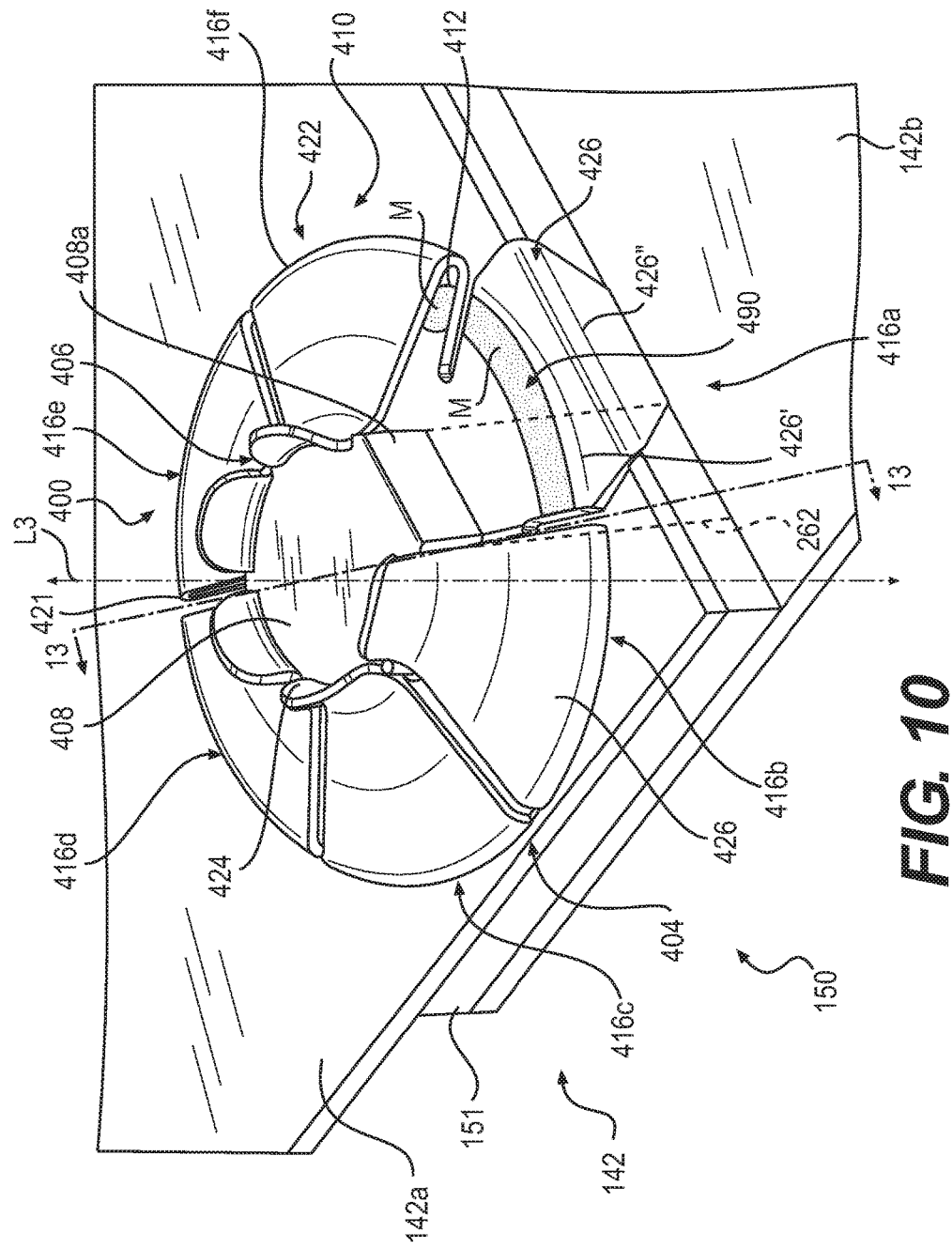
FIG. 10 is a detail view of a joint associated with the gas turbine engine of FIG. 1, which includes an exemplary heat resistant fastener system including an exemplary heat resistant washer with the fire retardant material in the first, inactive state according to the present disclosure.

With reference to FIG. 10, a fireproof system 400 is shown, which includes one or more heat resistant fastening systems 402. As the fireproof system 400 can be similar to the fireproof system 190 discussed with regard to FIGS. 1-6, only the differences between the fireproof system 190 and the fireproof system 400 will be discussed in detail herein, with the same reference numerals used to denote the same or substantially similar components. The fireproof system 400 can be employed with the joint 150 to fireproof the joint 150. With reference to FIG. 10, the fireproof system 400 comprises the one or more heat resistant fastening systems 402, which each include a fireproof or heat resistant washer 404. While a single heat resistant fastening system 402 is illustrated in FIG. 10, it will be understood that a plurality of heat resistant fastening systems 402 may span the joint 150 formed along the inner casing 142. It should be noted, however, that the one or more heat resistant fastening systems 402 may be positioned at or along any desired joint associated with the gas turbine engine 100, such that the one or more heat resistant fastening systems 402 may be used to join two adjacent components of the gas turbine engine 100 while providing fireproofing via the heat resistant washers 404. Thus, the location of the one or more heat resistant fastening systems 402 and the heat resistant washers 404 along the joint 150 of the inner casing 142 is merely an example. In this embodiment, the one or more heat resistant fastening systems 402 include a mechanical fastener 406 and the heat resistant washer 404.

The mechanical fastener 406 is generally composed of a metal or metal alloy, such as steel, and may be cast, machined or formed through any suitable forming technique. A head 408 of the mechanical fastener 406 cooperates with or bears against a portion of the heat resistant washer 404. In this example, the head 408 comprises a hex-head, such that the head 408 includes a plurality of flat surfaces 408a defined about a perimeter of the head 408 to facilitate the engagement of the head 408 with a suitable fastening driver device. It should be noted, however, that the head 408 may include additional or other coupling features, such as a recessed socket, etc. to facilitate the coupling of the head 408 to a suitable fastener driving device, such as a socket wrench, etc. The shank 212 (not shown in FIG. 10) extends from the head 408. The shank 212 includes the plurality of threads 216a that threadably engage the nut 218 (not shown in FIG. 10) to couple the mechanical fastener 406 at the joint 150.

The heat resistant washer 404 is substantially annular and is coupled about the shank 212 of the mechanical fastener 406 so as to be disposed between the head 408 and, in this example, the inner surface 142b of the inner casing 142. The heat resistant washer 404 includes a housing, and in this example, the housing includes a first housing portion 410 that defines a cavity 412. The first housing portion 410 is composed of any suitable material, such as a metal or metal alloy, and is machined, cast or stamped. Alternatively, the first housing portion 410 may be formed through selective laser sintering, for example. Generally, the heat resistant washer 404 is symmetrical about a longitudinal axis L3 of the heat resistant washer 404. It should be noted, however, that the heat resistant washer 404 may be asymmetrical about the longitudinal axis L3, if desired.

Figure 11:
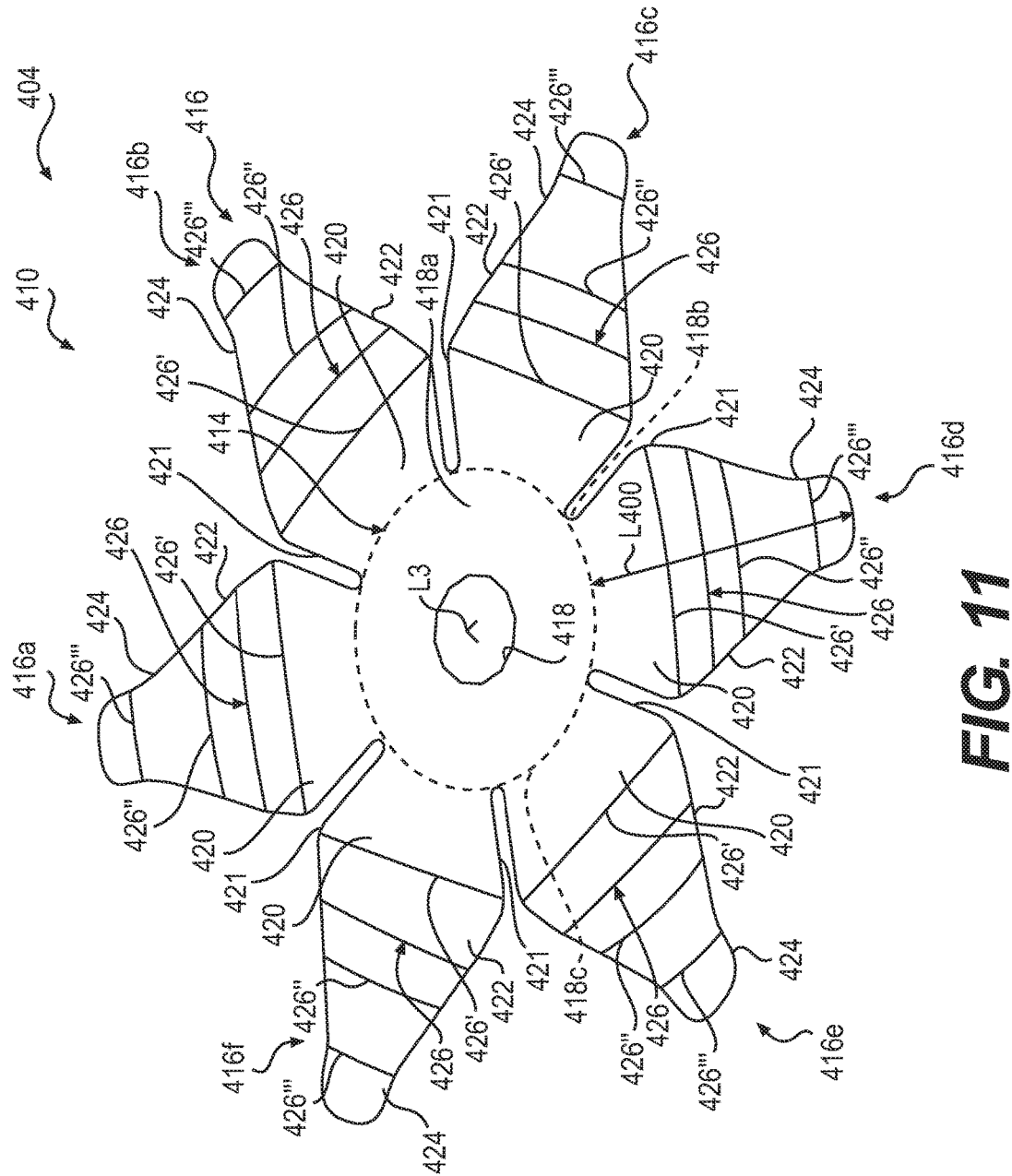
FIG. 11 is a perspective view of the heat resistant washer of FIG. 10 in a first position.
Figure 13:
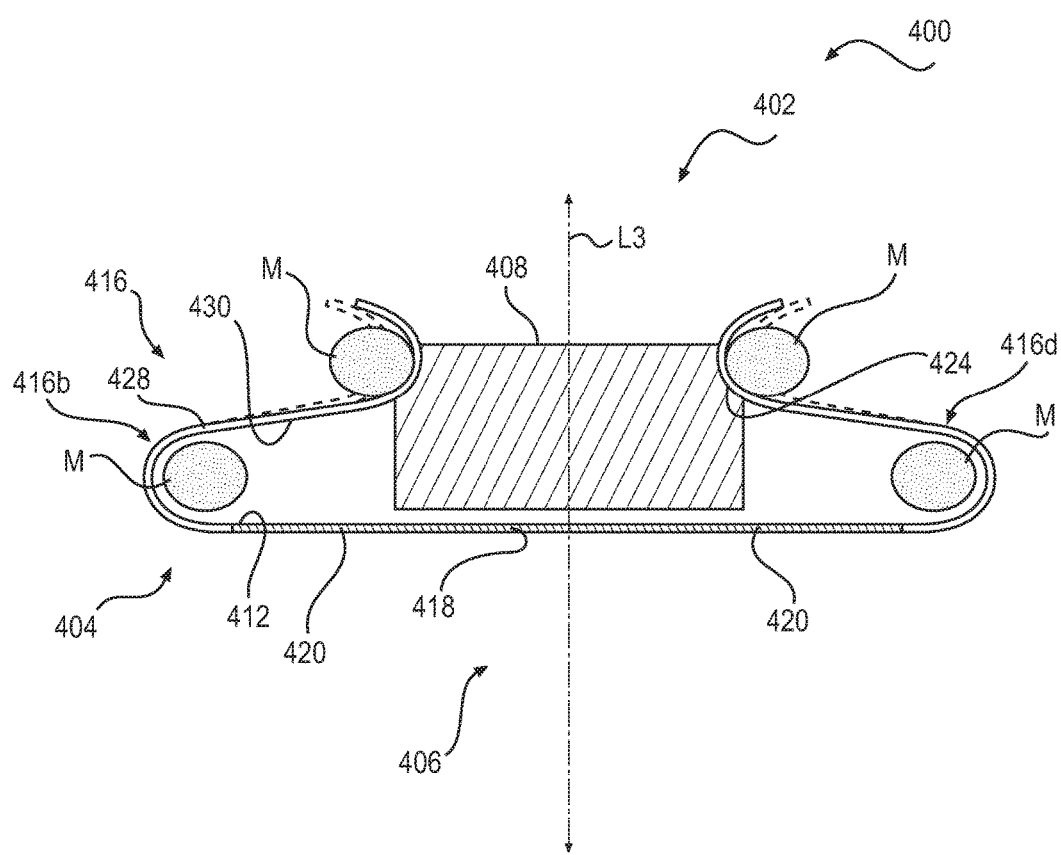
FIG. 13 is a cross-sectional view of the heat resistant washer of FIG. 10, taken along line 13-13 of FIG. 10.

With reference to FIG. 11, the first housing portion 410 is shown in a first, unassembled position. As illustrated in FIG. 11, the first housing portion 410 includes a base 414 and a flange, which in this example, comprises a plurality of flanges 416. The plurality of flanges 416 each extend outwardly from the base 414. In the first, unassembled position, the plurality of flanges 416 are each substantially coplanar with the base 414. The base 414 is substantially circular, and defines a bore 418 that receives a portion of the shank 212 of the mechanical fastener 406 (FIG. 13). The bore 418 is generally defined through the base 414 such that a central axis of the bore 418 extends along the longitudinal axis L3 of the heat resistant washer 404. The base 414 further defines a first surface 418a, a second surface 418b opposite the first surface 418a and a perimeter 418c. The first surface 418a is adjacent to the head 408 when the mechanical fastener 406 (FIG. 10) is coupled to the heat resistant washer 404. The second surface 418b is adjacent to the inner surface 142b of the inner casing 142 when the heat resistant washer 404 is coupled at the joint 150 (FIG. 10). The plurality of flanges 416 are each coupled to the perimeter 418c, and each extend outwardly from the perimeter 418c of the base 414.

In one example, the plurality of flanges 416 comprise six flanges 416a-416f, which are coupled about the perimeter 418c. In this example, the flanges 416a-416f are petal-like in shape, with an proximal end 420 that extends outwardly or widens to an enlarged or bulbous portion 422, and the bulbous portion 422 tapers to a distal end 424. The proximal end 420 is coupled to the perimeter 418c of the base 414. In this example, a plurality of slits 421 are defined from the perimeter 418c of the base 414 such that the flanges 416a-

416f are not interconnected, but rather, each of the flanges 416a-416f is connected solely to the base 414. By connecting each of the flanges 416a-416f solely to the base 414, each of the flanges 416a-416f are movable independently of the other flanges 416a-416f. This enables one or more of the flanges 416a-416f to be positioned as desired for a particular fireproof application. It should be noted, however, that one or more of the flanges 416a-416f may be interconnected to enable the interconnected ones of the flanges 416a-416f to move in unison, if desired.

Generally, the bulbous portion 422 and the distal end 424 of each of the flanges 416a-416f cooperate to define the cavity 412 when the heat resistant washer 404 is in the second, assembled position (FIG. 10). In addition, each of the flanges 416a-416f defines a length L400, which enables the distal end 424 to contact a portion of the head 408 of the mechanical fastener 406 when the heat resistant washer 404 is coupled to the mechanical fastener 406 in the second position (FIG. 10). Stated another way, the distal end 424 of each of the flanges 416a-416f is spaced apart from and substantially encircles the bore 418 of the base 414 in the second position.

In this example, the bulbous portion 422 and the distal end 424 of each of the flanges 416a-416f include one or more score marks 426. The one or more score marks 426 enable the flanges 416a-416f to be bent relative to the base 414 into various positions as defined by each of the score marks 426. In the example of FIG. 11, the flanges 416a-416f are illustrated as including about four score marks 426, however, the flanges 416a-416f may include any number of score marks 426. Moreover, the flanges 416a-416f may include score marks 426 at or near the proximal end 420. As used herein, the term "score marks" defines an area on the flanges 416a-416f that has a reduced thickness when compared to a reminder of the flange, which enables a portion of the respective flanges 416a-416f to be bent relative to a reminder of the respective flange or removed completely (e.g. broken off) from a reminder of the respective flange. The score marks 426 may be defined on the flanges 416a-416f through any suitable technique, such as etching, grinding, machining, etc. It should be understood that while each of the flanges 416a-416f are illustrated herein as comprising a plurality of score marks 426, only one or a subset of the plurality of flanges 416 may include the score marks 426. Moreover, the score marks 426 need not be uniform amongst the plurality of flanges 416. Stated another way, one or more of the flanges 416a-416f may include a pattern of score marks 426 that differs from a pattern of score marks 426 of another one of the flanges 416a-416f. Thus, the score marks 426 illustrated herein are merely exemplary. Further, for ease of illustration, the score marks 426 are illustrated herein as solid lines, with the understanding that each score mark 426 comprises an area of reduced thickness.

Figure 12:
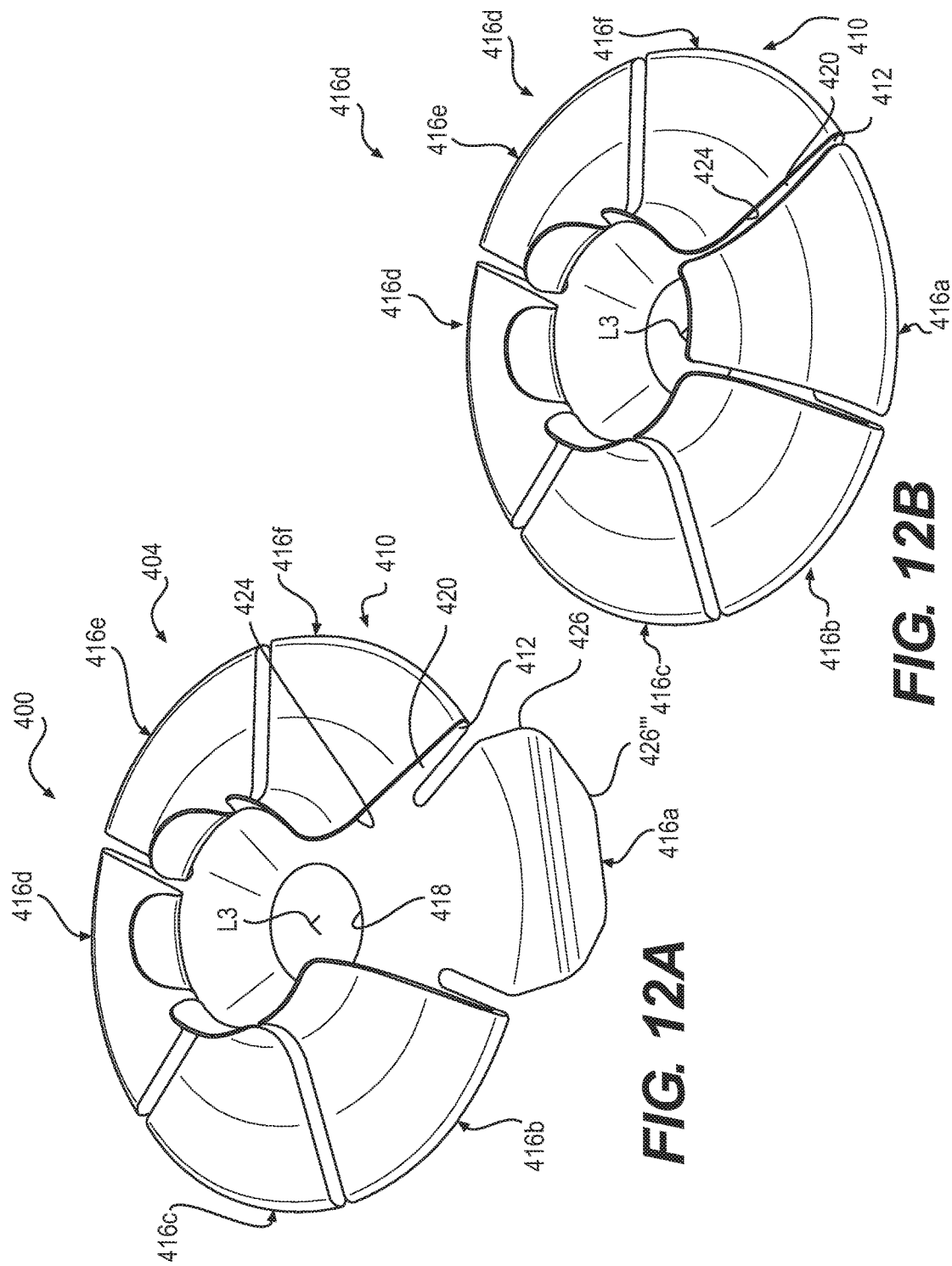
FIG. 12A is a perspective view of the heat resistant washer of FIG. 10 in a second position, with one of a plurality of flanges bent for anti-rotation.
FIG. 12B is a perspective view of the heat resistant washer of FIG. 10 in a second position.

The score marks 426 enable each of the flanges 416a-416f to be moved from the first position of FIG. 11 to the second position in FIG. 12B to define the cavity 412. Generally, the cavity 412 is defined by one or more of the flanges 416a-416f once the flanges 416a-416f are moved, bent or folded into the second position (FIG. 12B). In this example, a majority of the flanges 416a-416f are moved or folded at a score mark 426' adjacent to the proximal end 420, folded at a score mark 426" adjacent to the distal end 424 and folded at a score mark 426'" at the distal end 424 such that the distal end 424 contacts the head 408 of the mechanical fastener 406 when the mechanical fastener 406 extends through the bore 418, as best shown in FIG. 10.

Generally, with reference to FIG. 13, the cavity 412 is defined as a volume between the proximal end 420 of the respective ones of the plurality of flanges 416 and the distal end 424 of the respective ones of the plurality of flanges 416 when the plurality of flanges 416 are in the second, assembled position. The cavity 412 receives the fire retardant material M. Thus, by varying the length L400 of each of the plurality of flanges 416, the volume of the cavity 412 may be adjusted to correspond with different fireproofing requirements. In one example, a portion of the volume of the cavity 412 is filled with the fire retardant material M. It will be understood, however, a substantial entirety of the volume of the cavity 412 may be filled with the fire retardant material M depending upon the fireproofing or thermal resistance requirements, if desired. The volume defined by the cavity 412 may be filled with the fire retardant material M through any suitable technique, such as the use of an injection device, like an injection nozzle, or may be filled by spray coating the plurality of flanges 416, painting the fire retardant material M on the plurality of flanges 416, etc.

In addition, the fire retardant material M may be applied to one or more external or exterior surfaces 428 of the plurality of flanges 416. In this regard, the cavity 412 is defined by an internal or interior surface 430 of the plurality of flanges 416. In one example, as illustrated in FIG. 13, the exterior surfaces 428 may also receive the fire retardant material M near the distal end 424 of each of the plurality of flanges 416. It should be noted that one or a subset of the plurality of flanges 416 may receive the fire retardant material M on the exterior surfaces 428, and thus, the fire retardant material M need not be applied to the entirety of the plurality of flanges 416. Moreover, while the fire retardant material M is illustrated herein as being applied near the distal ends 424 of the plurality of flanges 416, the fire retardant material M may be applied over a substantial portion of the exterior surface 428 of the plurality of flanges 416, from the proximal end 420 to the distal end 424, and thus, FIG. 13 is merely an example. The application of the fire retardant material M on the exterior surfaces 428 of the plurality of flanges 416 provides additional fireproofing for the heat resistant fastening system 402.

Figure 14:
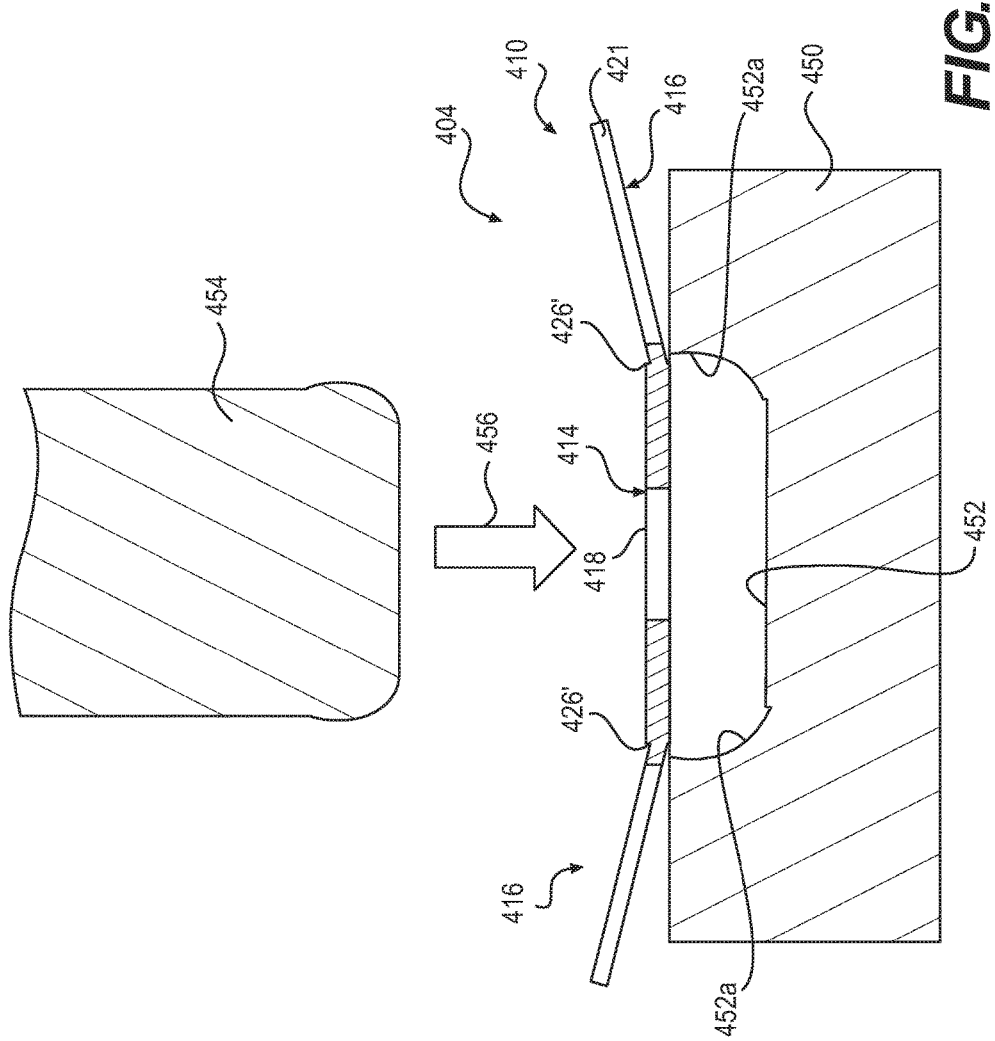
FIG. 14 is a schematic cross-sectional illustration of a first process of an exemplary method for forming the heat resistant washer of FIG. 10, taken along line 13-13 of FIG. 10.

In order to assemble the heat resistant washer 404, in one example, the first housing portion 410 is formed into the first position, as illustrated in FIG. 11. As discussed previously, in one example, the first housing portion 410 may be formed from stamping a sheet metal or metal alloy. The score marks 426 may be etched or otherwise defined on the first housing portion 410, via machining, for example. With the first housing portion 410 formed as illustrated in FIG. 11, with reference to FIG. 14, the first housing portion 410 is inserted into a mold 450. In this example, the mold 450 defines a cavity or recess 452, which receives a portion of the first housing portion 410, such as the base 414 and a portion of the flanges 416a-416f. The recess 452 may include arcuate or curved sidewalls 452a, which cooperate with a washer mold former 454, to bend the flanges 416a-416f from the first position (FIG. 11) to the second position (FIG. 12B). The washer mold former 454 may be directed toward the recess 452, along arrow 456, to move or bend the flanges 416a-416f along the score mark 426'.

Figure 15:
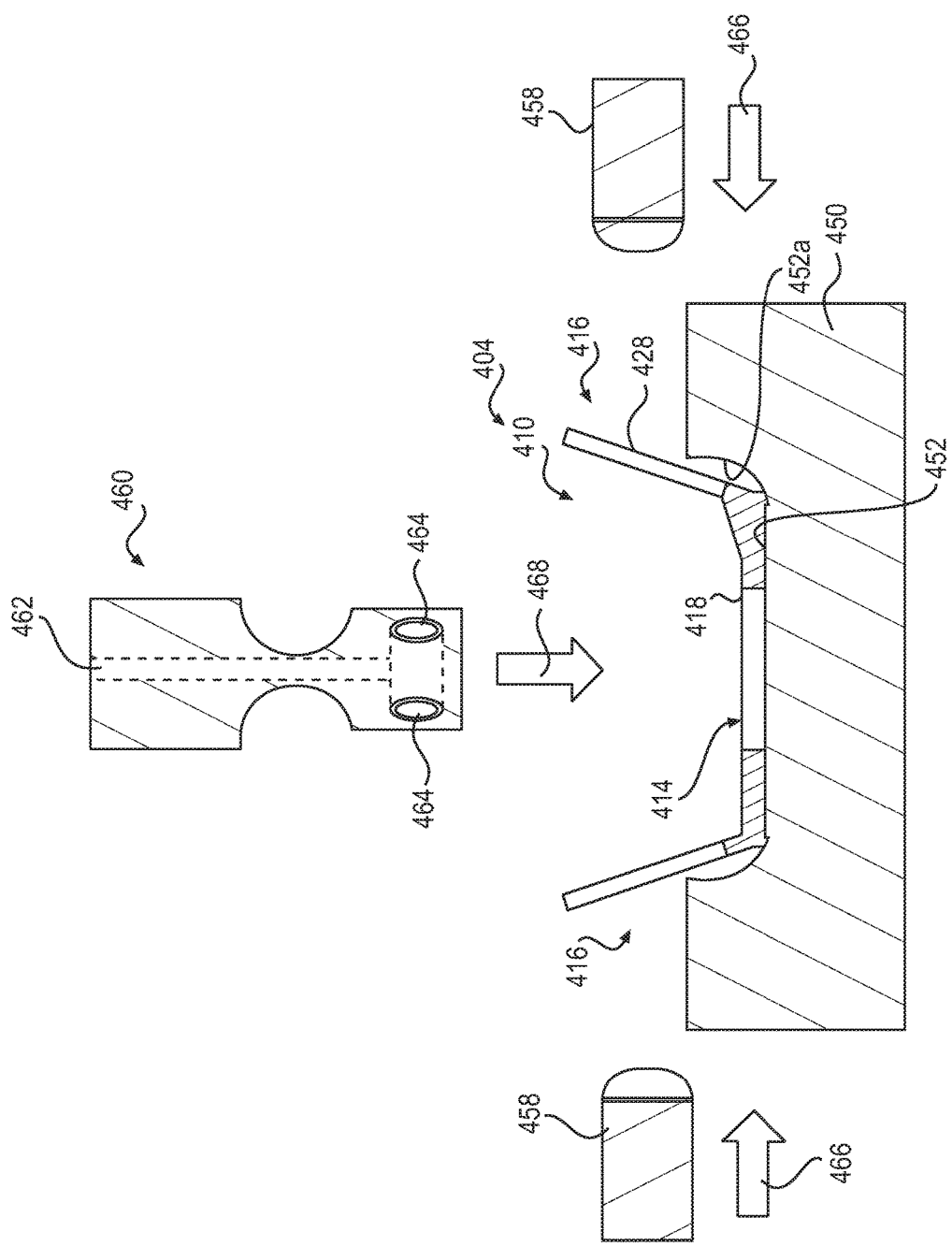
FIG. 15 is a schematic cross-sectional illustration of a second process of the exemplary method for forming the heat resistant washer of FIG. 10, taken along line 13-13 of FIG. 10.

With reference to FIG. 15, with the portion of the first housing portion 410 positioned within the recess 452 after being contacted by the washer mold former 454, a plurality of pedal formers 458 may be positioned about the heat resistant washer 404, such that a respective one of the plurality of pedal formers 458 is aligned with a respective one of the flanges 416a-416f. A mold former 460 may also be positioned over the first housing portion 410. The mold former 460 may include an injection port 462 and one or more injection nozzles 464. As the plurality of pedal formers 458 are advanced in the direction of arrows 466, the mold former 460 is advanced in the direction of the arrow 468. With the fire retardant material M loaded into the injection port 462, a pressure is applied to the injection port 462 to force the fire retardant material M out of the injection nozzles 464 into the cavity 412 as the plurality of pedal formers 458 substantially simultaneously move or bend each of the flanges 416a-416f to define the cavity 412. If desired, the fire retardant material M may be applied to the exterior surfaces 428 with a spray coating, dipping, painting or other suitable application method.

Figure 16:
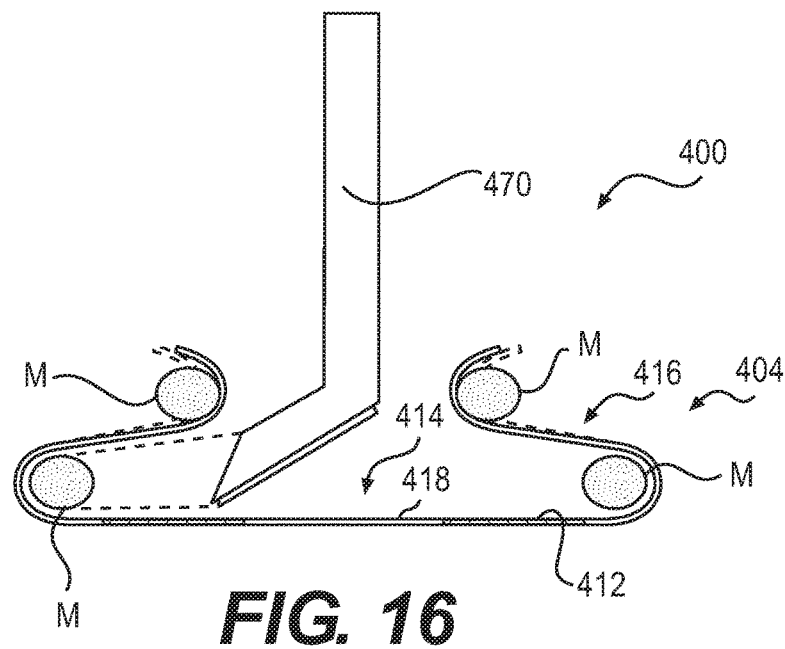
FIG. 16 is a schematic cross-sectional illustration of a third process of the exemplary method for forming the heat resistant washer of FIG. 10, taken along line 13-13 of FIG. 10.

It should be noted that the insertion of the fire retardant material M into the cavity 412 need not be through the mold former 460. In this regard, with reference to FIG. 16, a separate injection nozzle 470 may be used to inject the fire retardant material M within the cavity 412. The injection nozzle 470, in this example, may be rotated about the heat resistant washer 404 approximately 360 degrees such that fire retardant material M is disposed within the cavity 412 about an entirety of a perimeter or circumference of the cavity 412. As a further example, the fire retardant material M may be spray coated into the cavity 412, after the first housing portion 410 is formed into the second position (FIG. 12B).

With the heat resistant washer 404 assembled, the heat resistant washer 404 may be coupled to the mechanical fastener 406 as shown in FIG. 10. In this example, a respective heat resistant washer 404 may be positioned about the bore 262 defined through the first casing component 146, the seal 151 and the second casing component 148 at the joint 150, and a respective mechanical fastener 406 is inserted through the bore 418 of the heat resistant washer 404 such that the distal ends 424 contact the head 408 of the mechanical fastener 406 to assist in inhibiting the rotation of the heat resistant washer 404 relative to the mechanical fastener 406. A respective nut 218 may be coupled to the shank 212 of the mechanical fastener 406 to couple or secure the mechanical fastener 406 to the heat resistant washer 404 at the joint 150, thereby forming a respective heat resistant fastening system 402.

One or more of the flanges 416a-416f may be moved or bent from the second position (FIG. 12B) to a third position (FIGS. 10 and 12A) relative to the base 414 to aid in inhibiting or preventing the rotation of the heat resistant washer 404 relative to the respective one of the first casing component 146 and the second casing component 148, and inhibit or prevent the mechanical fastener 406 from rotating relative to the heat resistant washer 404. In the example of FIG. 10, the flange 416a is moved or bent at the score mark 426' downwardly, or towards the seal 151. The bent flange 416a cooperates with the contact between the distal ends 424 of the remaining flanges 416b-416f and the head 408 of the mechanical fastener 406 to inhibit the rotation of the heat resistant washer 404 and the mechanical fastener 406 at the joint 150. Moreover, by moving or bending the flange 416a relative to the remaining flanges 416b-416f, the fire retardant material M is directed outwardly, through an opening generally indicated as 490 defined by the bent flange 416a over the head 408 of the mechanical fastener 406 and over the joint 150. Thus, the bent flange 416a acts as a guide or directing feature in this embodiment, for directing the fire retardant material M in the second, active state over the head 408 of the mechanical fastener 406 and over the joint 150. It should be noted that while a single flange 416a is illustrated herein as being moved or bent upon assembly of the heat resistant fastening system 402, additional flanges 416b-416f may be moved or bent to further define a trajectory for the fire retardant material M in the second, active state. This process may be repeated for each of the heat resistant fastening systems 402 associated with the joint 150.

With the one or more heat resistant fastening systems 402 coupled at the joint 150, during an event, such as a thermal or fire event, the fire retardant material M disposed in the cavity 412 is heated. The heating of the fire retardant material M causes the fire retardant material M to change from the first, inactive state to the second, active state. In the second, active state, the fire retardant material M expands through the opening 490 over the head 408 of the mechanical fastener 406 and expands beyond the head 408 of the mechanical fastener 406 such that the fire retardant material M covers the joint 150.

By directing the fire retardant material M through the opening 490 defined by one or more of the flanges 416a-416f, the fire retardant material M may be directed to the area of the joint 150 that requires the fireproofing without requiring additional measures, such as fireproof paneling. Further, the use of the heat resistant washer 404 provides weight savings as the heat resistant washer 404 may weigh less than conventional fireproofing systems, such as fireproof panels. Moreover, the use of the heat resistant washer 404 enables the mechanical fastener 406 to be easily removed and replaced, during a repair, for example. Also, in the instance of a fire event, the used fire retardant material M from the associated heat resistant washer 404 may be easily removed and replaced with a new heat resistant washer 404, if desired. Thus, the heat resistant washer 404 enables fireproofing portions of the gas turbine engine 100 in a standardized way, in that the same heat resistant washer 404 may be used with any fastener having a bolt shank that is substantially the same size as the shank 212 and the bore 418 of the heat resistant washer 404, such as the mechanical fastener 204, 406, associated with the gas turbine engine 100. In addition, for each class or size of mechanical fastener, a corresponding heat resistant washer 404 may be provided with an appropriately sized bore 418 to enable the heat resistant washer 404 to adapt to various sizes and classes of fasteners. This reduces complexity of the fireproofing for the gas turbine engine 100, and moreover, provides weight savings for the gas turbine engine 100. In addition, the alignment shield 300 of FIGS. 8 and 9 may be employed with the heat resistant fastening system 402, if desired.

Figure 17:
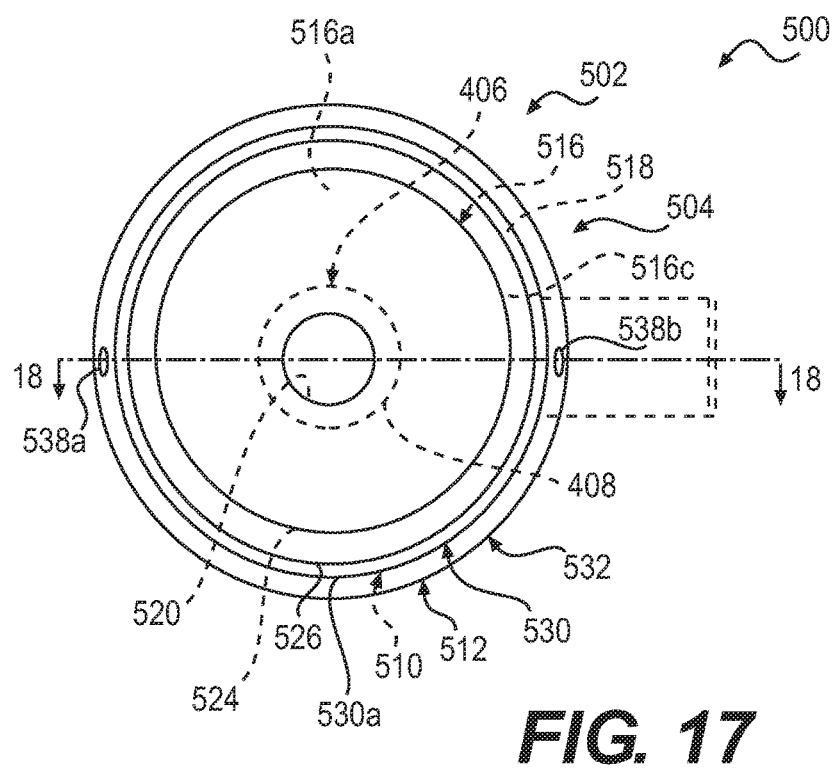
FIG. 17 is a top view of an exemplary heat resistant fastening system that includes an exemplary heat resistant washer according to the present disclosure, which includes an optional anti-rotation feature.

With reference to FIG. 17, a fireproof system 500 is shown, which includes one or more heat resistant fastening systems 502. As the fireproof system 500 can be similar to the fireproof system 190 discussed with regard to FIGS. 1-6 and the fireproof system 400 discussed with regard to FIGS. 10-16, only the differences between the fireproof system 190, the fireproof system 400 and the fireproof system 500 will be discussed in detail herein, with the same reference numerals used to denote the same or substantially similar components. The fireproof system 500 can be employed with the joint 150 to fireproof the joint 150 (FIG. 1).

With reference to FIG. 17, the fireproof system 500 comprises the one or more heat resistant fastening systems 502, which each include a fireproof or heat resistant washer 504. While a single heat resistant fastening system 502 is illustrated in FIG. 17, it will be understood that a plurality of heat resistant fastening systems 502 may span the joint 150 formed along the inner casing 142, similar to the heat resistant fastening system 190 of FIG. 1. It should be noted, however, that the one or more heat resistant fastening systems 502 may be positioned at or along any desired joint associated with the gas turbine engine 100 (FIG. 1), such that the one or more heat resistant fastening systems 502 may be used to join two adjacent components of the gas turbine engine 100 (FIG. 1) while providing fireproofing via the heat resistant washers 504. Thus, the location of the one or more heat resistant fastening systems 502 and the heat resistant washers 504 along the joint 150 of the inner casing 142 (FIG. 1) is merely an example. In this embodiment, the one or more heat resistant fastening systems 502 include the mechanical fastener 406 and the heat resistant washer 504.

Figure 18:
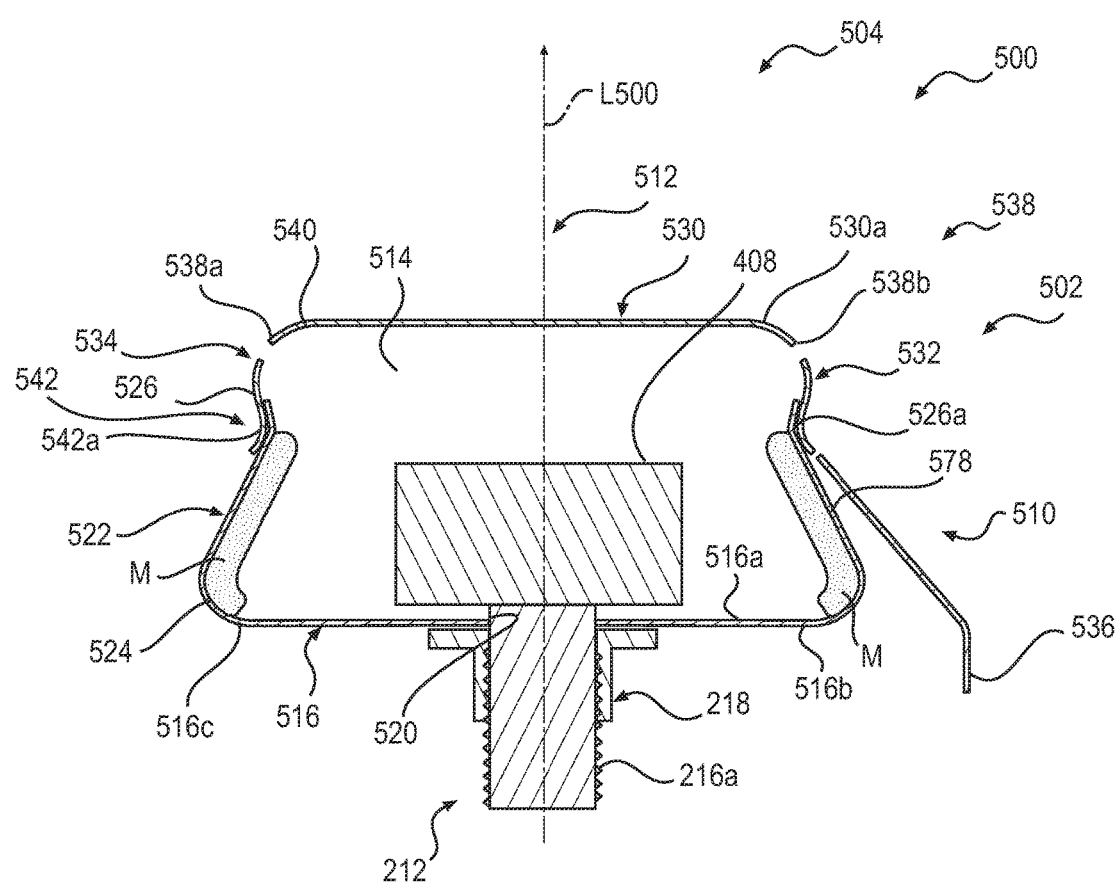
FIG. 18 is a cross-sectional view of the heat resistant washer of FIG. 17, taken along line 18-18 of FIG. 17.

With additional reference to FIG. 18, the heat resistant washer 504 is substantially annular and is coupled about the shank 212 of the mechanical fastener 406 so as to be disposed between the head 408 and, in this example, the nut 218. The heat resistant washer 504 includes a housing, and in this example, the housing includes a first housing portion 510 and a second housing portion 512 that are coupled together to define a cavity 514. The first housing portion 510 and the second housing portion 512 are each composed of any suitable material, such as a metal or metal alloy, and are each machined, cast or stamped. Alternatively, the first housing portion 510 and/or the second housing portion 512 may be formed through selective laser sintering, for example. The second housing portion 512 is coupled to the first housing portion 510 through any suitable technique, and in one example, the second housing portion 512 is snap-fit onto the first housing portion 510. It should be understood that the second housing portion 512 may be coupled to the first housing portion 510 via any other technique, such as a threaded coupling, set screws, etc. Generally, the heat resistant washer 504 is asymmetrical about a longitudinal axis L500 of the heat resistant washer 504. It should be noted, however, that the heat resistant washer 504 may be symmetrical about the longitudinal axis L500, if desired.

In this example, with reference to FIG. 17, the first housing portion 510 includes a base 516 and a flange 518, which extends outwardly from the base 516. The base 516 is substantially circular, and defines a bore 520 that receives a portion of the shank 212 of the mechanical fastener 406. The bore 520 is generally defined through the base 516 such that a central axis of the bore 520 extends along the longitudinal axis L500 of the heat resistant washer 504 (FIG. 18). The base 516 further defines a first surface 516a, a second surface 516b (FIG. 18) and a perimeter 516c. The first surface 516a is adjacent to the head 408 when the mechanical fastener 406 is coupled to the heat resistant washer 504. The second surface 516b is adjacent to the inner surface 142b when the heat resistant washer 504 is coupled at the joint 150. The flange 518 is coupled to the perimeter 516c, and extends outwardly from the perimeter 516c of the base 516.

The flange 518 includes a wall 522. In this example, the flange 518 is substantially cup or U-shaped. The wall 522 has a first end 524 and a second end 526. The first end 524 is coupled to the perimeter 516c of the base 516. In one example, the wall 522 has a slope between the first end 524 and the second end 526 such that the second end 526 of the wall 522 is not coplanar with the first end 524. The second end 526 is coupled to the second housing portion 512. In one example, the second end 526 includes an inward protrusion 526a, which cooperates with the second housing portion 512 to couple the first housing portion 510 to the second housing portion 512.

The second housing portion 512 is coupled to the second end 526 of the first housing portion 510. In this example, the second housing portion 512 is substantially C-shaped, and defines a second base 530 and a second flange 532. It should be noted that the shape of the second housing portion 512 is merely exemplary, as the second housing portion 512 may have a shape that conforms to the shape of the first housing portion 510 to substantially enclose and define the cavity 514. With reference to FIG. 18, the second base 530 is substantially continuous or uniform, and planar. The second base 530 further defines a perimeter 530a. The second flange 532 is coupled to the perimeter 530a, and extends outwardly from the perimeter 530a of the second base 530.

In one example, with reference to FIG. 18, the second flange 532 includes a second wall 534, an optional locking tab 536 and one or more guides or directing features, such as directing bores 538. The second wall 534 has a third end 540 and a fourth end 542. The third end 540 is coupled to the perimeter 530a of the second base 530, and the fourth end 542 is coupled to the second end 526 of the first housing portion 510. Generally, the fourth end 542 includes an inward facing deflection 542a, which cooperates with the inward protrusion 526a to snap-fit the second housing portion 512 onto the first housing portion 510. It should be noted, that the inward protrusion 526a and the inward facing deflection 542a may be optional.

The locking tab 536 extends from a portion of the fourth end 542 of the second housing portion 512. Generally, the locking tab 536 extends for a distance that enables the locking tab 536 to engage a portion of the joint 150 (FIG. 1) to prevent the rotation of the heat resistant washer 504 relative to the respective one of the first casing component 146 and the second casing component 148. The locking tab 536 may have any desired shape, and may be generally deformable into a desired shape to lock the position of the heat resistant washer 504 relative to the respective one of the first casing component 146 and the second casing component 148. The heat resistant washer 504 may also include additional features to inhibit or prevent the rotation of the mechanical fastener 406 relative to the heat resistant washer 504. For example, the bore 520 of the first housing portion 510 may include a radially extending projection, which engages a portion of the shank 212 of the mechanical fastener 406 to prevent the rotation of the mechanical fastener 406 relative to the heat resistant washer 504.

In this example, the one or more directing bores 538 are defined through a portion of the second wall 534 adjacent to the third end 540 such that the one or more directing bores 538 are in communication with the cavity 514 to direct the fire retardant material M in the second, active state towards the joint 150. In this example, the one or more directing bores 538 comprise two directing bores 538a-538b. Each of the directing bores 538a-538b are defined to direct a fire retardant material M within the cavity 514 towards the joint 150, thereby fireproofing or shielding the joint 150 during a thermal event as will be discussed further herein.

With reference to FIG. 18, the cavity 514 is defined as a volume between the first housing portion 510 and the second housing portion 512 that receives the fire retardant material M. In this example, the size of the cavity 514 may be varied by changing a height of the wall 522 of the first housing portion 510, which enables the heat resistant washer 504 to be adjusted to correspond with different fireproofing requirements. In one example, only a portion of the volume in the cavity 514 is filled with the fire retardant material M to enable the head 408 of the mechanical fastener 406 to be received within the first housing portion 510 without contacting the fire retardant material M. It will be understood, however, that substantially an entirety of the cavity 514 may be filled with the fire retardant material M depending upon the fireproofing or thermal resistance requirements, if desired. The volume defined by the cavity 514 may be filled with the fire retardant material M through any suitable technique, such as the use of an injection device, like an injection nozzle, spray coating, painting, etc. Moreover, the fire retardant material M may be coupled to an exterior surface of the first housing portion 510 or a surface of the first housing portion 510 opposite the cavity 514, if desired, by spray coating, painting, etc. to provide additional fireproofing.

With continued reference to FIG. 18, in order to assemble the heat resistant washer 504, in one example, with the first housing portion 510 formed, the fire retardant material M is inserted into the cavity 514. With the fire retardant material M disposed in the first housing portion 510, the heat resistant washer 504 may be coupled to the mechanical fastener 406. In this example, a respective heat resistant washer 504 may be positioned about the bore 262 (FIG. 10) defined through the first casing component 146, the seal 151 and the second casing component 148 at the joint 150, and a respective mechanical fastener 406 is inserted through the bore 520 of the heat resistant washer 504. A respective nut 218 may be coupled to the shank 212 of the mechanical fastener 406 to couple or secure the mechanical fastener 204 to the heat resistant washer 202 at the joint 150. The second housing portion 512 may be snap-fit onto the first housing portion 510 to enclose the cavity 514, thereby forming a respective heat resistant fastening system 502. If employed, the optional locking tab 536 may be moved or bent over the joint 150 to couple the heat resistant washer 504 at the joint 150 at a fixed orientation. This process may be repeated for each of the heat resistant fastening systems 502 associated with the joint 150.

With the one or more heat resistant fastening systems 502 coupled at the joint 150, during an event, such as a thermal or fire event, the fire retardant material M disposed in the cavity 514 is heated. The heating of the fire retardant material M causes the fire retardant material M to change from the first, inactive state to the second, active state. In the second, active state, the fire retardant material M expands over the head 408 of the mechanical fastener 406 and expands through the one or more directing bores 538 such that the fire retardant material M covers the joint 150 (FIG. 1).

By directing the fire retardant material M through the one or more directing bores 538, the fire retardant material M may be directed to the area of the joint 150 that requires the fireproofing without requiring additional measures, such as fireproof paneling. Further, the use of the heat resistant washer 504 provides weight savings as the heat resistant washer 504 may weigh less than conventional fireproofing systems, such as fireproof panels. Moreover, the use of the heat resistant washer 504 enables the mechanical fastener 406 to be easily removed and replaced, during a repair, for example. Also, in the instance of a fire event, the used fire retardant material M from the associated heat resistant washer 504 may be easily removed and replaced with a new heat resistant washer 504, if desired. Thus, the heat resistant washer 504 enables fireproofing portions of the gas turbine engine 100 (FIG. 1) in a standardized way, in that the same heat resistant washer 504 may be used with any fastener having a bolt shank that is substantially the same size as the shank 212 and the bore 520 of the heat resistant washer 504, such as the mechanical fastener 204, 406, associated with the gas turbine engine 100 (FIG. 1). In addition, for each class or size of mechanical fastener, a corresponding heat resistant washer 504 may be provided with an appropriately sized bore 520 to enable the heat resistant washer 504 to adapt to various sizes and classes of fasteners. This reduces complexity of the fireproofing for the gas turbine engine 100, and moreover, provides weight savings for the gas turbine engine 100 (FIG. 1). In addition, the alignment shield 300 of FIGS. 8 and 9 may be employed with the heat resistant fastening system 502, if desired.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A heat resistant washer for a heat resistant fastening system, the heat resistant washer comprising:
    a fire retardant material;
    a housing that includes a first housing portion and a second housing portion, the first housing portion includes a base and a flange having a wall that extends outwardly from the base and a lip coupled to the wall, with a throughbore defined through the base to receive a fastener, the second housing portion coupled to the base and to the lip to define a cavity between the first housing portion and the second housing portion adjacent to the throughbore and the first housing portion includes at least one guide, the at least one guide is at least one bore defined through the wall, the fire retardant material disposed within the cavity and the at least one bore directs the fire retardant material in an active state out of the cavity; and
    an alignment shield that defines a bore adapted to receive the shank of the fastener and the alignment shield includes at least one guide arm that cooperates with the at least one guide of the flange to direct the fire retardant material in the active state.

2. The heat resistant washer of claim 1, wherein the second housing portion is coupled to a perimeter of the lip of the flange and extends about the first housing portion between the flange and the base to define the cavity.

3. A heat resistant fastening system, comprising:
    a fastener having a head and a shank;
    a heat resistant washer including a housing having a first housing portion that includes a base and a flange, with a bore defined through the base that receives the shank of the fastener, the housing defining a cavity that surrounds the head of the fastener and the flange of the first housing portion comprises a plurality of flanges that are movable between at least a first position and a second position, and the first position is different than the second position;
    a fire retardant material disposed within the cavity so as to be positioned adjacent to the head of the fastener when the fastener is received within the cavity, and
    wherein the housing includes at least one guide to direct the fire retardant material in an active state out of the cavity, at least one of the plurality of flanges is movable to a third position relative to the base to define the at least one guide, and the third position is different than the first position and the second position.

4. The heat resistant fastening system of claim 3, wherein in the second position, the distal end of each of the plurality of flanges is spaced apart from and substantially encircles the bore of the base.

5. The heat resistant fastening system of claim 3, wherein each of the plurality of flanges include a proximal end, a distal end and an enlarged portion between the proximal end and the distal end, and in the second position, the enlarged portion of each of the plurality of flanges defines the cavity.

6. The heat resistant fastening system of claim 5, wherein in the second position, the distal end of each of the plurality of flanges contacts the head of the fastener.

7. The heat resistant fastening system of claim 3, wherein in the third position, the at least one of the plurality of flanges inhibits the rotation of the heat resistant washer.

8. A heat resistant fastening system, comprising:
a fastener having a head and a shank;
a heat resistant washer including a first housing portion and a second housing portion, the first housing portion having a base and a flange, with a bore defined through the base that receives the shank of the fastener and the flange including at least one guide, the second housing portion coupled to the first housing portion to define a cavity, the cavity in communication with the at least one guide;
a fire retardant material disposed within the cavity and the at least one guide directs the fire retardant material in an active state out of the cavity about the head of the fastener; and
an alignment shield that defines a bore to receive the shank of the fastener and at least one guide arm that cooperates with the at least one guide of the flange to direct the fire retardant material in the active state.

* * * * *